(12) United States Patent
Haruna et al.

(10) Patent No.: US 12,728,602 B2
(45) Date of Patent: Sep. 8, 2026

(54) JOINING METHOD, JOINED BODY, AND JOINING DEVICE

(71) Applicant: KAWASAKI JUKOGYO KABUSHIKI KAISHA, Kobe (JP)

(72) Inventors: Shunsuke Haruna, Kobe (JP); Shintaro Fukada, Kobe (JP); Ryoji Ohashi, Kobe (JP); Ryoichi Hatano, Kobe (JP)

(73) Assignee: KAWASAKI JUKOGYO KABUSHIKI KAISHA, Kobe (JP)

( * ) Notice: Subject to any disclaimer, the term of this patent is extended or adjusted under 35 U.S.C. 154(b) by 330 days.

(21) Appl. No.: 18/269,699

(22) PCT Filed: Dec. 24, 2021

(86) PCT No.: PCT/JP2021/048290

§ 371 (c)(1),
(2) Date: Jun. 26, 2023

(87) PCT Pub. No.: WO2022/145382

PCT Pub. Date: Jul. 7, 2022

(65) Prior Publication Data

US 2024/0316873 A1 Sep. 26, 2024

(30) Foreign Application Priority Data

Dec. 28, 2020 (JP) ................................ 2020-218993
Mar. 30, 2021 (JP) ................................ 2021-057902

(51) Int. Cl.

| | |
|---|---|
| ***B29C 65/06*** | (2006.01) |
| ***B23K 20/12*** | (2006.01) |
| ***B29C 65/56*** | (2006.01) |

(52) U.S. Cl.
CPC ...... *B29C 65/0681* (2013.01); *B23K 20/1255* (2013.01); *B23K 20/1265* (2013.01); *B23K 20/127* (2013.01); *B29C 65/562* (2013.01)

(58) Field of Classification Search
CPC ............. B29C 65/0681; B29C 65/562; B23K 20/1255; B23K 20/1265; B23K 20/127
(Continued)

(56) References Cited

U.S. PATENT DOCUMENTS 6,702,535 B1 3/2004 Stevenson et al.
10,173,370 B2 1/2019 Ueno et al.
(Continued)

FOREIGN PATENT DOCUMENTS

CN 101829903 A * 9/2010 ............ B21J 15/025
CN 103240564 A 8/2013
(Continued)

OTHER PUBLICATIONS

Machine_English_translation_CN_101829903_A; Li et al.; Single-Sided Self-Piercing friction stub rivet welding device and connection method thereof; Sep. 15, 2010; EPO; whole document (Year: 2025).*

*Primary Examiner* — Tahseen Khan
(74) *Attorney, Agent, or Firm* — Oliff PLC

(57) ABSTRACT

An overlapping part of a first member and a second member is joined using a tool for friction stir spot welding and a rivet. The first member is disposed on a side where the tool is press-fitted first, and the second member is disposed on a side where the tool is press-fitted last, so that the overlapping part is formed. The tool is press-fitted into the overlapping part to perform friction stirring, thereby forming a friction stirred part in the overlapping part. The rivet is press-fitted into the friction stirred part from the first member side.

19 Claims, 22 Drawing Sheets

(58) Field of Classification Search
USPC .......................................................... 428/189
See application file for complete search history.

(56) References Cited

U.S. PATENT DOCUMENTS

| | | | |
|---|---|---|---|
| 2006/0213954 A1 | 9/2006 | Ruther et al. | |
| 2013/0248083 A1 | 9/2013 | Takahashi et al. | |
| 2017/0136686 A1 | 5/2017 | Ueno et al. | |
| 2017/0291215 A1 | 10/2017 | Memili | |
| 2018/0094660 A1* | 4/2018 | Mayer | F16B 19/086 |
| 2019/0143442 A1* | 5/2019 | Ohashi | B23K 11/16 428/172 |
| 2019/0309775 A1 | 10/2019 | Potocki et al. | |
| 2021/0146635 A1 | 5/2021 | Mayer et al. | |
| 2021/0331421 A1 | 10/2021 | Okada et al. | |

FOREIGN PATENT DOCUMENTS

| | | |
|---|---|---|
| CN | 212177585 U | 12/2020 |
| EP | 1 566 234 B1 | 1/2008 |
| JP | 5333584 B2 | 11/2013 |
| JP | 2020-535038 A | 12/2020 |
| WO | 2018/102804 A1 | 6/2018 |
| WO | 2020/145243 A1 | 7/2020 |

* cited by examiner

CONTROLLER
C
M
R
TOOL DRIVING UNIT
2
ROTATION DRIVING UNIT
21
UP
DOWN
CLAMP DRIVING UNIT
24
SHOULDER DRIVING UNIT
23
PIN DRIVING UNIT
22
14
1
12
11
13
5
30
31
32
3
W
15

33
33A
33B
33C
34
34
34
34
32A
t2
30
W
BD
32
31
31A
t1
UP
DOWN (A)
(B)
(C)
(D)
1
11
12
13
30
31
32
30U
11T
12T
15
4
41
42

JOINING METHOD, JOINED BODY, AND JOINING DEVICE

TECHNICAL FIELD

The present disclosure relates to a joining method for joining an overlapping part of two or more members using friction stirring and a fastener, a joined body using the joining method, and a joining device used in the joining method.

BACKGROUND ART

As a component of a structure such as an aircraft, a railway vehicle, or an automobile, a metal member, a resin member, a thermoplastic resin member mixed with fiber reinforcements, or the like is used. Manufacturing of the structure may require two or more members to be joined in an overlapping manner. Known examples of a technique of this joining include joining using a fastener such as a rivet and joining using friction stirring.

Examples of a literature disclosing a joining technique of fiber-reinforced thermoplastic resin members include Patent Literature 1. Patent Literature 1 discloses a method for joining resin members using a self-piercing rivet and a special lower mold for heat-treating the resin members.

However, even the above joining method may not obtain sufficient joining strength and joint quality depending on a material of a member to be joined. For example, when resin members with continuous fibers impregnated with a thermoplastic resin are joined to each other, a technique of simply driving a self-piercing rivet may cause the rivet not to be deformed to such an extent that an anchor effect is exerted. Even when a joined part is formed using a technique of forcibly deforming a self-piercing rivet using a special lower mold in combination, interlayer peeling or the like may occur, and thus a base material may be deteriorated in strength and appearance quality. Then, a joined body depending only on friction stir welding may not obtain sufficient peel strength.

CITATION LIST

Patent Literature

Patent Literature 1: JP 5333584 B2

SUMMARY OF INVENTION

Problems to be Solved by the Invention

It is an object of the present disclosure to provide a joining method capable of joining an overlapping part of two or more members more firmly than before, a joined body using the joining method, and a joining device used in the joining method.

Means for Solving the Problems

A joining method according to an aspect of the present disclosure uses a tool for friction stir welding and a fastener to join an overlapping part formed including a first member on a tool side and a second member disposed below the first member, the joining method including: press-fitting the tool into the overlapping part to perform friction stirring, and forming a friction stirred part in the overlapping part, and press-fitting the fastener into the friction stirred part from a first member side.

This joining method enables obtaining a joined body having excellent strength by using friction stirring and a fastener in combination. That is, the overlapping part is provided with a friction stirred part into which the fastener is press-fitted later. The friction stirred part is formed in which constituent materials of the overlapping part are kneaded by friction stirring and the constituent materials are softened. The fastener can be easily press-fitted into the friction stirred part described above. Thus, the fastener is likely to exert its own fastening effect. For example, when the constituent materials are insufficiently softened, or contain a reinforcing material or a filler, the fastener is less likely to be deformed as intended. The friction stirred part eliminates this difficulty, so that the fastener is likely to have an original deformation due to press-fitting. Thus, a joined body having high strength can be obtained.

A joined body according to another aspect of the present disclosure is a joined body of an overlapping part formed including a first member and a second member, the joined body including: an overlapping part in which the first member is disposed on one end side in an overlapping direction overlapping the second member disposed on another end side in the overlapping direction; a friction stirred part provided in the overlapping part; and a fastener press-fitted into the friction stirred part.

This joined body allows the friction stirred part formed in the overlapping part and the fastener press-fitted into the friction stirred part to apply a joining force to the overlapping part. That is, the first member and the second member can be firmly engaged by the fastening effect of the fastener without depending only on friction stir welding. Thus, a joined body having excellent joint strength can be constructed.

A joining device according to still another aspect of the present disclosure is a joining device that joins an overlapping part formed including a first member and a second member, the joining device including: a pin member in a columnar shape that is movable forward and backward in an axial direction; a shoulder member in a cylindrical shape that is positioned covering an outer periphery of the pin member to be rotatable about an axis identical to the pin member and movable forward and backward in the axial direction; and a fastener that is loaded in an accommodation space created by raising of the pin member, and is press-fitted into a friction stirred part formed in the overlapping part by the pin member.

Using this joining device enables processes of friction stirring of the overlapping part to press-fitting of the fastener to be smoothly performed in a flow process.

Effects of the Invention

The present disclosure enables an overlapping part of two or more members to be firmly joined by using friction stirring and a fastener in combination.

BRIEF DESCRIPTION OF DRAWINGS

FIG. 11A is a cross-sectional view illustrating an implementation status of a joining method according to a third embodiment.

FIG. 19 illustrates a cross-sectional view of an implementation status of each of processes (A) to (D) of the joining method according to the seventh embodiment.

DESCRIPTION OF EMBODIMENTS

Figure 1A:
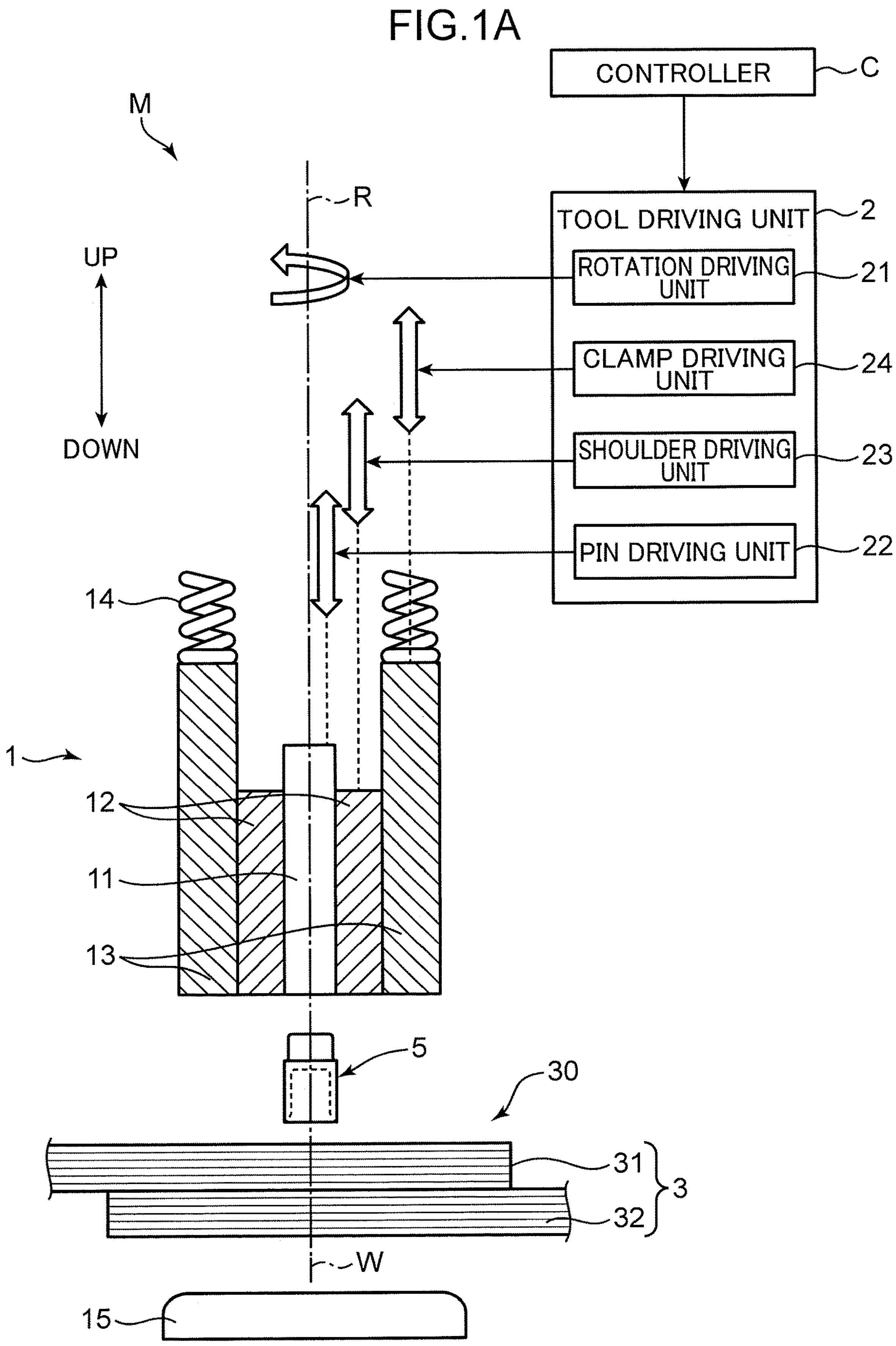
FIG. 1A is a schematic view illustrating a configuration of a double-acting friction stir spot welding device capable of performing a joining method according to the present disclosure.

Hereinafter, embodiments of the present disclosure will be described in detail with reference to the drawings. A joining method according to the present disclosure can be applied to manufacture of various joined bodies in each of which two or more structural members are stacked and joined at a point, examples of the structural members including a plate, a frame, an exterior member, and a columnar member, which are each made of metal, a thermoplastic resin, a thermoplastic composite material, or the like. The thermoplastic composite material is a composite material including fiber reinforcements such as carbon fibers, for example. The joined body to be manufactured serves as a component of a structure such as an aircraft, a railway vehicle, or an automobile, for example.

[Configuration of Double-Acting Friction Stir Spot Welding Device]

First, a configuration example of a double-acting friction stir spot welding device M capable of performing the joining method according to the present disclosure will be described with reference to FIG. 1A. The friction stir spot welding device M includes a double-acting friction stir spot welding tool 1, a tool driving unit 2 that rotates the tool 1 and drives the tool 1 up and down, and a controller C that controls operation of the tool driving unit 2. Although FIG. 1 indicates directions "up" and "down" for convenience of description, the directions are not intended to limit an actual use direction of the tool 1.

The tool 1 is supported by a tool fixing part that is not illustrated. The tool fixing part can be a leading end part of an articulated robot, for example. A backup member 15 is disposed facing a lower end surface of the tool 1. At least two members to be joined are disposed between the tool 1 and the backup member 15. FIG. 1A illustrates an example in which an overlapping part 30 is disposed between the tool 1 and the backup member 15, the overlapping part 30 including a part of the first member 31 formed of a flat plate and a part of the second member 32 formed of a flat plate similarly, the parts overlapping each other in a vertical direction. The overlapping part 30 described above is joined by a joining method using friction stirring and a rivet 5 (fastener) in combination, so that a joined body 3 of the first member 31 and the second member 32 is formed. The overlapping part 30 may further include one or more members interposed between the first member 31 and the second member 32.

The tool 1 includes a pin member 11, a shoulder member 12, a clamp member 13, and a spring 14. The pin member 11 is formed in a columnar shape, and is disposed with an axis extending in the vertical direction. The pin member 11 can rotate about the axis as a rotation axis R, and can move up and down, or forward and backward in the vertical direction along the rotation axis R. When the tool 1 is used, the rotation axis R is aligned with a spot welding position W in the overlapping part 30.

The shoulder member 12 is positioned covering an outer periphery of the pin member 11. The shoulder member 12 includes a hollow part into which the pin member 11 is inserted, and is formed in a cylindrical shape. The shoulder member 12 has an axis coaxial with the rotation axis R that is the axis of the pin member 11. The shoulder member 12 can rotate about the same rotation axis R as the pin member 11, and can move up and down, or forward and backward in the vertical direction along the rotation axis R. Both the shoulder member 12 and the pin member 11 inserted into the hollow part can relatively move in the rotation axis R direction while rotating around the rotation axis R. That is, the pin member 11 and the shoulder member 12 can not only move up or down simultaneously along the rotation axis R, but also independently move such that one lowers and the other rises.

The clamp member 13 includes a hollow part into which the shoulder member 12 is inserted, and is formed in a cylindrical shape. The clamp member 13 has an axis that is also coaxial with the rotation axis R. The clamp member 13 does not rotate about the axis, but can move up and down, or forward and backward in the vertical direction along the rotation axis R. The clamp member 13 serves to surround the outer periphery of the pin member or the shoulder member when the pin member 11 or the shoulder member 12 performs friction stirring. The surrounding of the clamp member 13 enables a friction stir spot welded part to be finished smoothly without scattering friction stirred material.

The spring 14 is attached to an upper end or a part near the upper end of the clamp member 13 and biases the clamp member 13 in a direction (downward) toward the overlapping part 30. The clamp member 13 is attached to the tool fixing part with the spring 14 interposed therebetween. The backup member 15 includes a plane that is in contact with a lower surface or a part near the lower surface of the overlapping part 30 to be joined. The backup member 15 is a backing member that supports the overlapping part 30 when the pin member 11 or the shoulder member 12 is press-fitted into the overlapping part 30. The clamp member 13 biased by the spring 14 presses the overlapping part 30 against the backup member 15.

The tool driving unit 2 includes a rotation driving unit 21, a pin driving unit 22, a shoulder driving unit 23, and a clamp driving unit 24. The rotation driving unit 21 includes a motor, a driving gear, and the like, and rotatably drives the pin member 11 and the shoulder member 12 about the rotation axis R. The pin driving unit 22 is a mechanism that moves the pin member 11 forward and backward along the rotation axis R. The pin driving unit 22 drives the pin member 11 so that the pin member 11 is press-fitted into the overlapping part 30 and retracted from the overlapping part 30. The shoulder driving unit 23 is a mechanism that moves the shoulder member 12 forward and backward along the rotation axis R, and causes the shoulder member 12 to be press-fitted into and retracted from the overlapping part 30. The clamp driving unit 24 is a mechanism that moves the clamp member 13 forward and backward along the rotation axis R. The clamp driving unit 24 moves the clamp member 13 toward the overlapping part 30 and presses the overlapping part 30 against the backup member 15. At this time, a biasing force of the spring 14 acts.

The controller C includes a microcomputer or the like, and executes a predetermined control program to control operation of each unit of the tool driving unit 2. Specifically, the controller C controls the rotation driving unit 21 to cause each of the pin member 11 and the shoulder member 12 to perform required rotation operation. The controller C also controls the pin driving unit 22, the shoulder driving unit 23, and the clamp driving unit 24 to cause each of the pin member 11, the shoulder member 12, and the clamp member 13 to perform required operation of forward and backward movement.

Examples of a method for using the double-acting friction stir spot welding tool 1 described above include a pin preceding process and a shoulder preceding process. The pin preceding process includes a friction stirring process in which the pin member 11 of the tool 1 is press-fitted into the overlapping part 30 in advance to perform friction stirring while the shoulder member 12 is raised, that is, retracted. In a subsequent backfilling process, the pin member 11 is raised and retracted while the shoulder member 12 is lowered. In contrast, the shoulder preceding process a friction stirring process in which the shoulder member 12 of the tool 1 is press-fitted into the overlapping part 30 to perform friction stirring while the pin member 11 is raised, that is, retracted. In a subsequent backfilling process, the shoulder member 12 is raised and retracted while the pin member 11 is moved down.

The friction stir spot welding device M according to the present embodiment is desirably provided with a mechanism capable of loading the rivet 5 into the tool 1 in advance because the welding is performed using both the friction stirring and the rivet 5. FIG. 1B is a cross-sectional view illustrating an example of loading the rivet 5 to the tool 1. The shoulder member 12 is provided near its upper end with a supply opening 121 for supplying the rivet 5 into the hollow part of the shoulder member 12. The friction stir spot welding device M includes a supply mechanism (not illustrated) that continuously feeds the rivet 5 to the supply opening 121.

The pin driving unit 22 raises the pin member 11 to have a lower end part 11T above a height position of the supply opening 121. The shoulder driving unit 23 raises the shoulder member 12 to have the supply opening 121 at a position higher than an upper end 132 of the clamp member 13. After the rivet 5 is supplied from the supply opening 121 into the shoulder member 12, the pin member 11 is lowered. As schematically illustrated near a lower end of the tool 1 illustrated in FIG. 1B, the rivet 5 is pressed down at the lower end part 11T of the pin member 11 and driven to the overlapping part 30.

[Member to be Joined]

Figure 2:
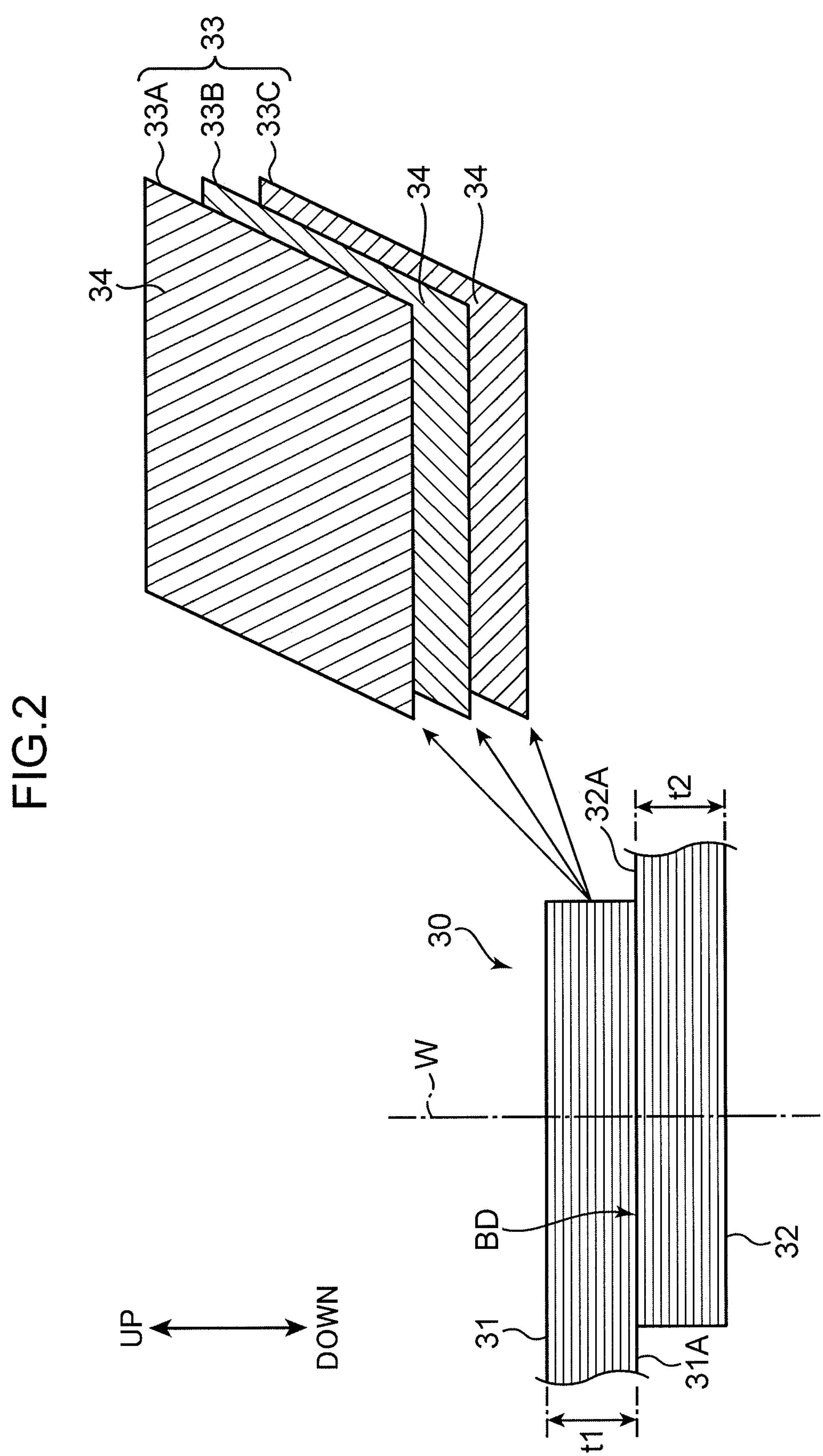
FIG. 2 is a diagram illustrating structure of a first member and a second member joined by a joining method.

FIG. 2 is a diagram illustrating structure of the overlapping part 30 joined by the joining method of the present embodiment. The first member 31 and the second member 32 are overlapped in the vertical direction to form the overlapping part 30. The first member 31 has a thickness t1 in an overlapping direction. The second member 32 has a thickness t2 equal to the thickness t1 (t1=t2). The thicknesses t1 and t2 may be different from each other as long as friction stir welding is available.

As described above, the member to be joined in the present disclosure is not particularly limited, and can be selected from members made of metal, thermoplastic resin, thermoplastic composite material, and the like. Among them, each of the first member 31 and the second member 32 is desirably a molding made of a fiber-reinforced thermoplastic resin. Examples of the molding of a fiber-reinforced thermoplastic resin include a molding formed by mixing short fibers or long fibers as a fiber-reinforced material with a thermoplastic resin, and a molding formed by impregnating a thermoplastic resin into a fiber array body in which continuous fibers are arranged in a predetermined direction or a woven fabric of continuous fibers.

Examples of the thermoplastic resin available as a constituent material of the first member 31 and the second member 32 include polypropylene (PP), polyethylene (PE), polyamide (PA), polystyrene (PS), polyaryletherketone (PEAK), polyacetal (POM), polycarbonate (PC), polyethylene terephthalate (PET), polyetheretherketone (PEEK), polyphenylene sulfide (PPS), ABS resin, and thermoplastic epoxy resin. Available examples of the fiber-reinforced material include carbon fiber, glass fiber, ceramic fiber, metal fiber, and organic fiber.

Although each of the first member 31 and the second member 32 may be formed of one molding of a fiber-reinforced thermoplastic resin, it is preferably formed of a laminate of a plurality of thin layer sheets. FIG. 2 illustrates an example in which a molding formed by laminating sheets in multiple layers is used as each of the first member 31 and the second member 32, the sheets each containing an array of continuous fibers impregnated with a thermoplastic resin as in a prepreg.

FIG. 2 illustrates a part of a sheet laminate 33 constituting the first member 31. The sheet laminate 33 includes a first sheet layer 33A, a second sheet layer 33B, and a third sheet layer 33C, which are each formed of a sheet in which an array of continuous fibers is impregnated with a thermoplastic resin. The first sheet layer 33A is a sheet having a thickness of about 0.1 mm to 0.5 mm, and including a number of continuous fibers 34 arranged in a predetermined arrangement direction to form an array that is impregnated with a thermoplastic resin and integrated as the sheet. Although the second sheet layer 33B and the third sheet layer 33C are also sheets similar to the above, they are different from each other in arrangement direction of the continuous fibers 34. As described above, when three types of sheets are laminated in multiple layers, the sheets each including the continuous fibers 34 arranged in corresponding one of three axial directions different from each other, for example, the first member 31 has pseudo isotropy. The second member 32 is also a plate formed of a multilayer laminate of sheets similar to those of the first member 31.

Available examples of the continuous fibers 34 include carbon fiber, glass fiber, ceramic fiber, metal fiber, and organic fiber. Although FIG. 2 exemplifies the sheet in which the continuous fibers 34 are arranged in one direction, a fabric type sheet may be used in which a woven fabric is formed using the continuous fibers as the warp and the weft and then impregnated with a thermoplastic resin. Instead of the continuous fibers 34, a sheet or a plate in which long fibers having a length of about 2 mm to 20 mm or short fibers are mixed with a thermoplastic resin can also be used.

Although the first member 31 and the second member 32 may be identical in material as in the example described above, they may be different in material. For example, one of the first member 31 and the second member 32 may be a molding of a thermoplastic resin, and the other may be a molding of a fiber-reinforced thermoplastic resin. In this case, desirable examples of the second member 32 located on a side where the pin member 11 or the shoulder member 12 of the tool 1 is press-fitted last include a molding of a fiber-reinforced thermoplastic resin and a molding in which continuous fibers are impregnated with a thermoplastic resin. Alternatively, one of the first member 31 and the second member 32 may be a molding of a specific thermoplastic resin or metal, and the other may be a molding of a thermoplastic resin or metal different from the specific thermoplastic resin or metal.

Figure 1B:
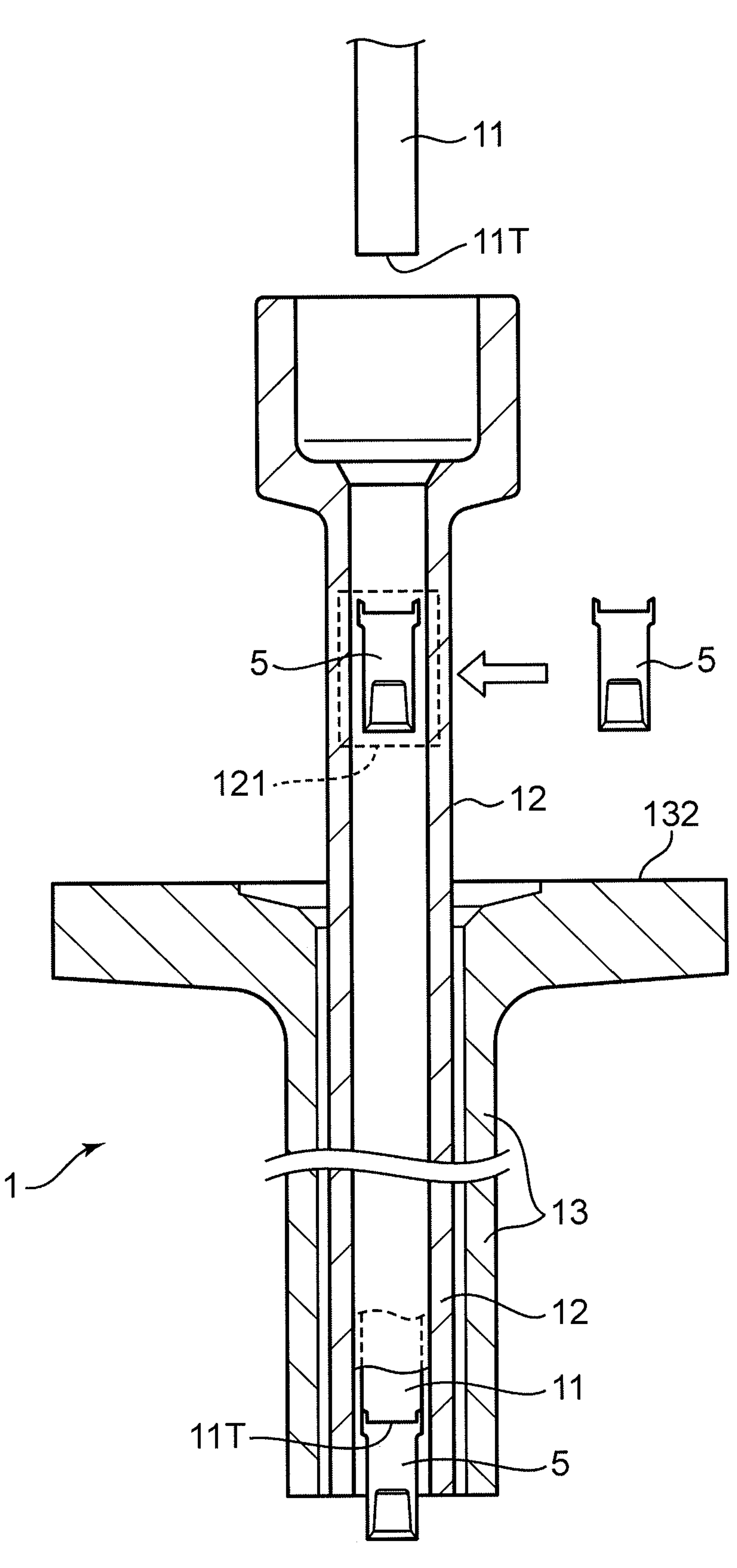
FIG. 1B is a cross-sectional view illustrating an example of loading a rivet to a tool.

Available examples of the rivet 5 exemplified in FIG. 1A as an example of the fastener include a self-piercing rivet. The rivet 5 is partly deformed by being driven to the overlapping part 30, and then generates an engaging force for integrating the first member 31 and the second member 32. As will be described in detail later, the rivet 5 according to the present embodiment is driven to a region subjected to friction stirring by the tool 1 in the overlapping part 30, and then partly penetrates into a base material part not subjected to friction stirring to generate the engaging force. The material of the rivet 5 is not particularly limited, and available examples of the rivet 5 include a rivet made of a metal such as titanium, a rivet made a thermoplastic resin, and a rivet made a thermoplastic composite material. Instead of the self-piercing rivet, various joining members partly deformable may be used as the fastener.

Joining Method According to First Embodiment

Figure 3:
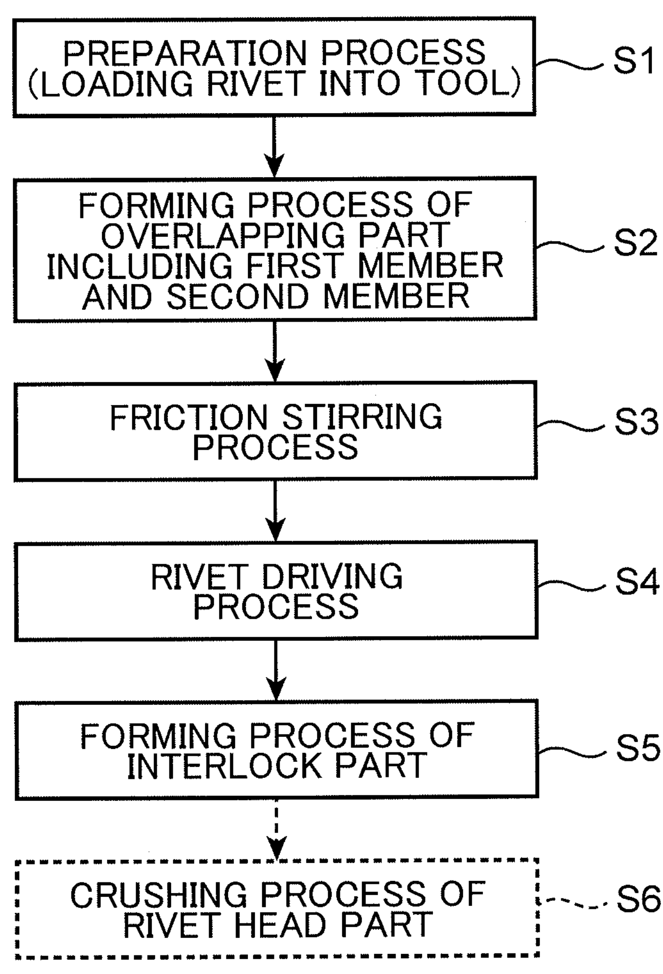
FIG. 3 is diagram illustrating a process chart of a joining method according to a first embodiment.

FIG. 3 is diagram illustrating a process chart of a joining method according to a first embodiment. The joining method according to the present embodiment is for the overlapping part 30 including the first member 31 and the second member 32, and includes the following processes S1 to S6.

Process S1: A preparation process of preliminarily loading the rivet 5 to be driven into the tool 1.

Process S2: A forming process of the overlapping part 30 including the first member 31 and the second member 32.

Process S3: A friction stirring process of performing friction stirring by press-fitting the shoulder member 12 of the tool 1 into the overlapping part 30.

Process S4: A rivet driving process of press-fitting the rivet 5 into a friction stirred part from the first member 31 side with the pin member 11 of the tool 1.

Process S5: A process of forming an interlock part by partly deforming the driven rivet 5.

Process S6: A crushing process of crushing a rivet head part as necessary.

Figure 4:
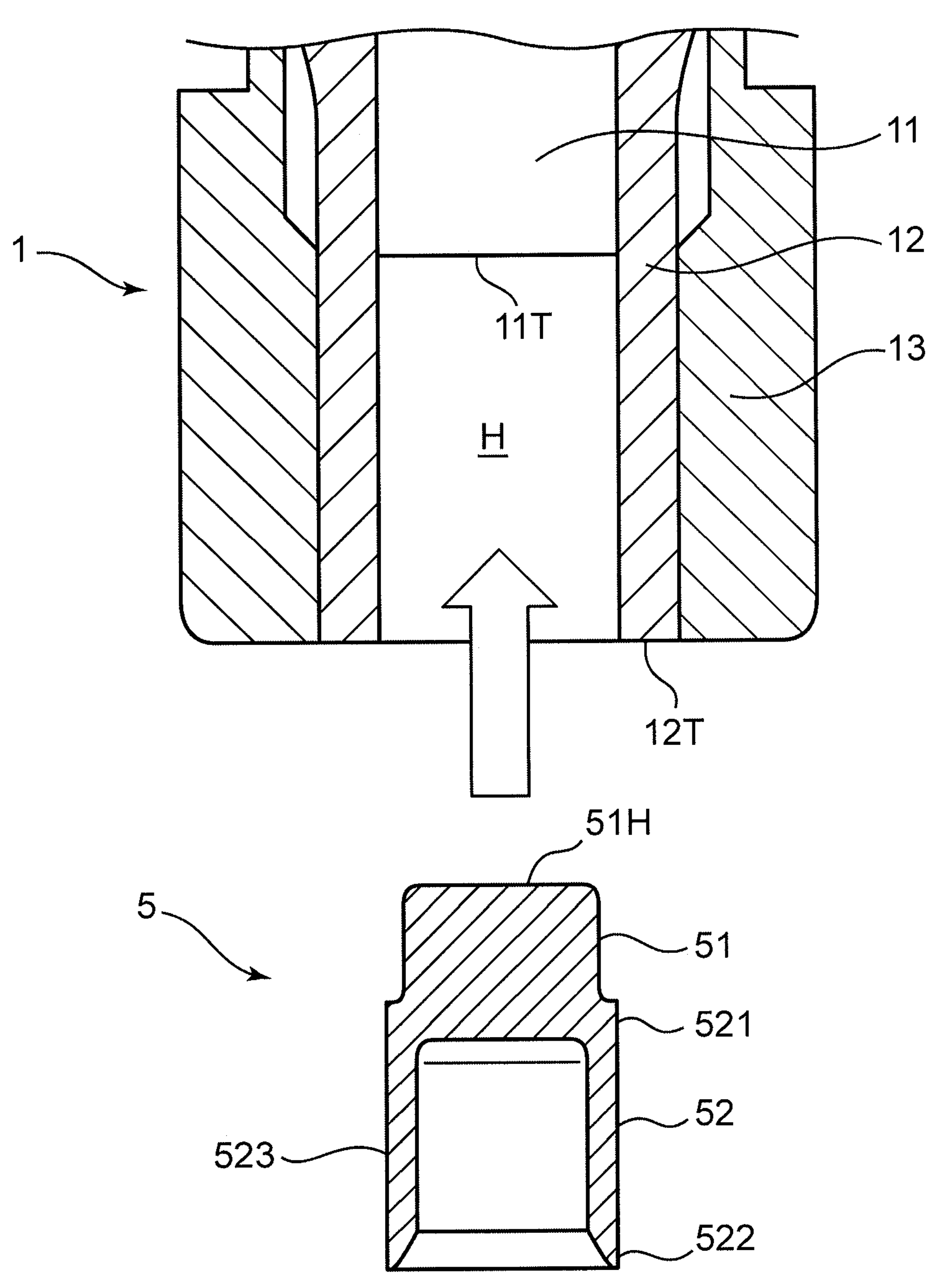
FIG. 4 is a cross-sectional view illustrating an implementation status of a preparation process of a joining method.

Hereinafter, each of the above processes S1 to S6 will be specifically described. FIG. 4 is a cross-sectional view illustrating the preparation process of process S1. FIG. 4 illustrates a longitudinal section of the rivet 5. The rivet 5 is made of a titanium alloy such as Ti-6Al-4V, for example, and includes a head part 51 and a shaft part 52 continuous below the head part 51. The head part 51 is formed of a solid body and has a top surface 51H that receives a press-fitting force from the tool 1. The shaft part 52 includes an upper end part 521 integrally connected to the head part 51 and a lower end part 522 serving as a leading end part when being driven to the overlapping part 30. The shaft part 52 includes a columnar hollow region 523 therein to have easy deformability. The lower end part 522 is also an opening edge of the hollow region 523 and has an annular end edge shape.

On a tool 1 side, operation for loading the rivet 5 is performed. Specifically, the controller C (FIG. 1) causes the pin driving unit 22 to operate to raise the pin member 11, thereby creating an accommodation space H for the rivet 5 in the hollow part of the shoulder member 12. That is, the lower end part 11T of the pin member 11 is relatively raised by a height of the rivet 5 or more with respect to a lower end part 12T of the shoulder member 12, and then the accommodation space H is provided near a lower end opening of the shoulder member 12. As a matter of course, a rivet having an outer diameter smaller than an inner diameter of the hollow part of the shoulder member 12 is selected as the rivet 5. After that, the rivet 5 is loaded into the accommodation space H. The preparation process described above is based on the premise that friction stirring is performed by applying the shoulder preceding process.

The tool 1 in the preparation process of process S1 described above forms an aspect of a joining device for implementing the joining method of the present embodiment. This joining device includes the pin member 11, the shoulder member 12, and the rivet 5 (fastener) that is loaded in the accommodation space H created in the shoulder member 12 by rising of the pin member and that is press-fitted into the friction stirred part by the pin member 11.

Figure 5:
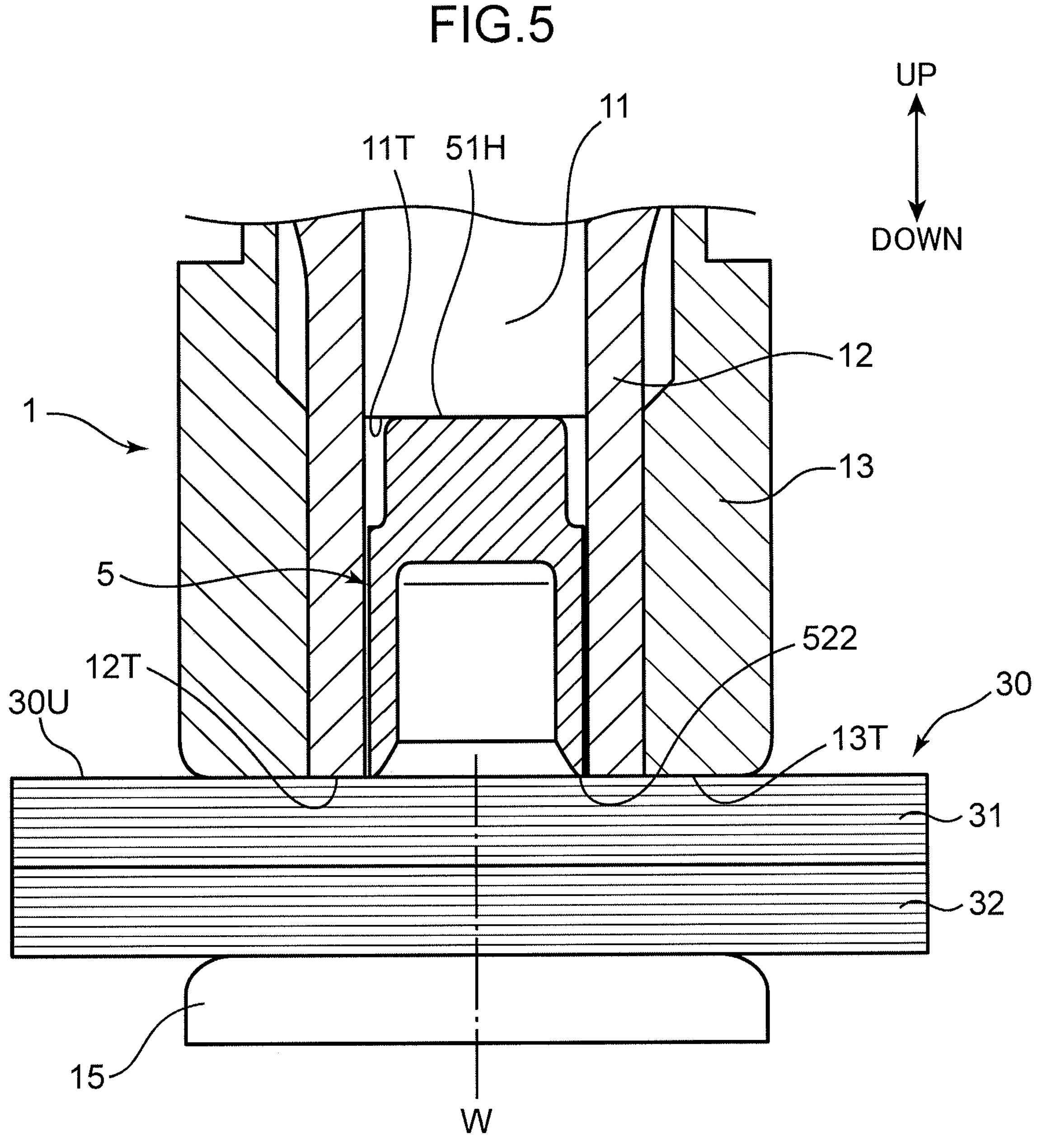
FIG. 5 is a cross-sectional view illustrating an implementation status of a forming process of an overlapping part.

FIG. 5 is a cross-sectional view illustrating an implementation status of the forming process of forming the overlapping part 30 of process S2. In process S2, the first member 31 and the second member 32 are disposed forming the overlapping part 30 in which the first member 31 and the second member 32 overlap each other while the first member 31 and the second member 32 are at least partly in contact with each other. The present embodiment exemplifies the overlapping part 30 in which the first member 31 in a plate shape partly serves as an upper member and the second member 32 in a plate shape partly serves as a lower member, the upper member and the lower member being vertically overlapped.

The tool 1 loaded with the rivet 5 is disposed above the overlapping part 30. That is, the first member 31 is disposed on a side where the tool 1 is press-fitted first, and the second member 32 is disposed on a side where the tool 1 is press-fitted last, so that the overlapping part 30 is formed. That is, the first member 31 is disposed on a tool 1 side, and the second member 32 is disposed below a lower layer of the first member 31. The lower surface of the overlapping part 30 is supported by the backup member 15. Although illustrated in FIG. 15 described later, the overlapping part 30 may be formed by interposing one or more other members between the first member 31 and the second member 32.

Referring also to FIG. 2, the overlapping part 30 is formed with a mating surface BD where a joining surface 31A (lower surface) of the first member 31 and a joining surface 32A (upper surface) of the second member 32 are in direct contact with each other. In the overlapping part 30 with two layers as described above, the tool 1 performs friction stirring with a required spot welding position W as an axial center, and press-fits the rivet 5. Thus, the lower end surface of the tool 1 is in contact with the upper surface of the first member 31 while the rotation axis R (FIG. 1) of the tool 1 is aligned with the spot welding position W. FIG. 5 illustrates a state where the lower end part 12T of the shoulder member 12 and a lower end part 13T of the clamp member 13 are in contact with an upper surface 30U of the overlapping part 30. The clamp member 13 presses the overlapping part 30 against the backup member 15 with a biasing force of the spring 14.

Figure 6A:
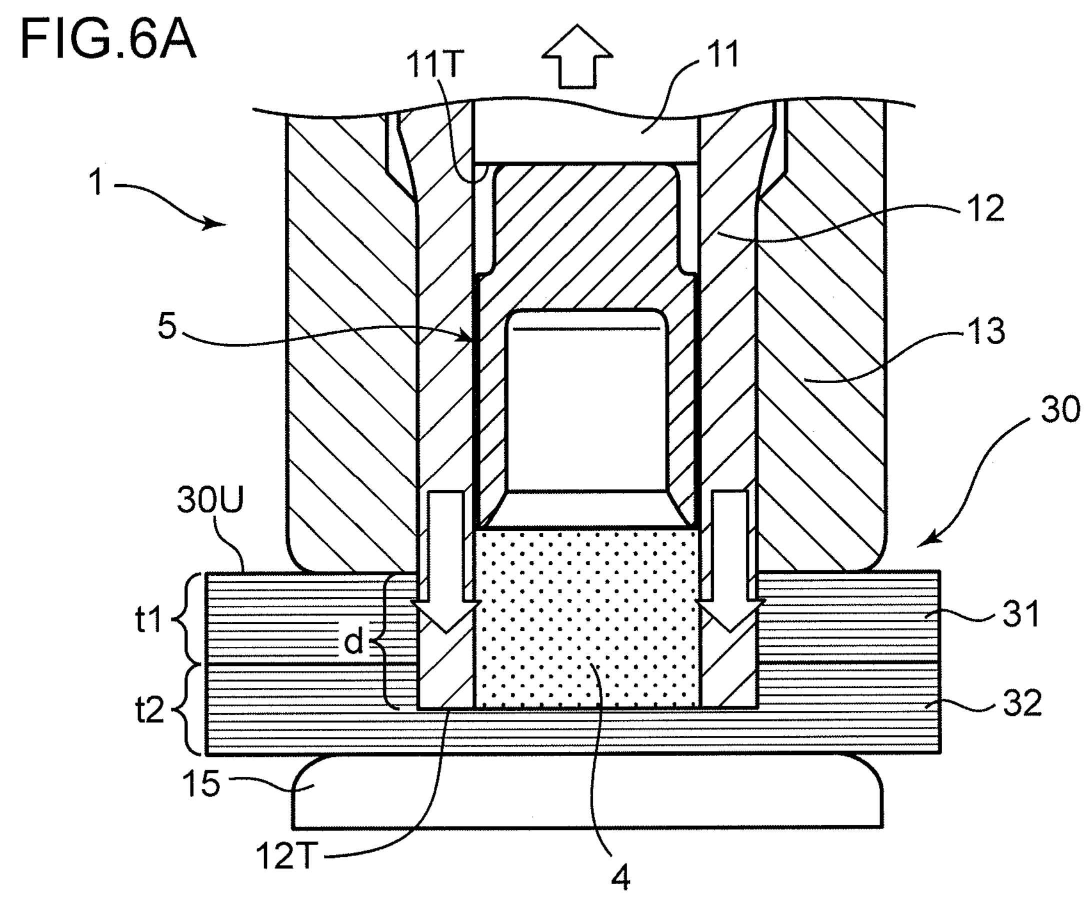
FIG. 6A is a cross-sectional view illustrating an implementation status of a friction stirring process.
Figure 6B:
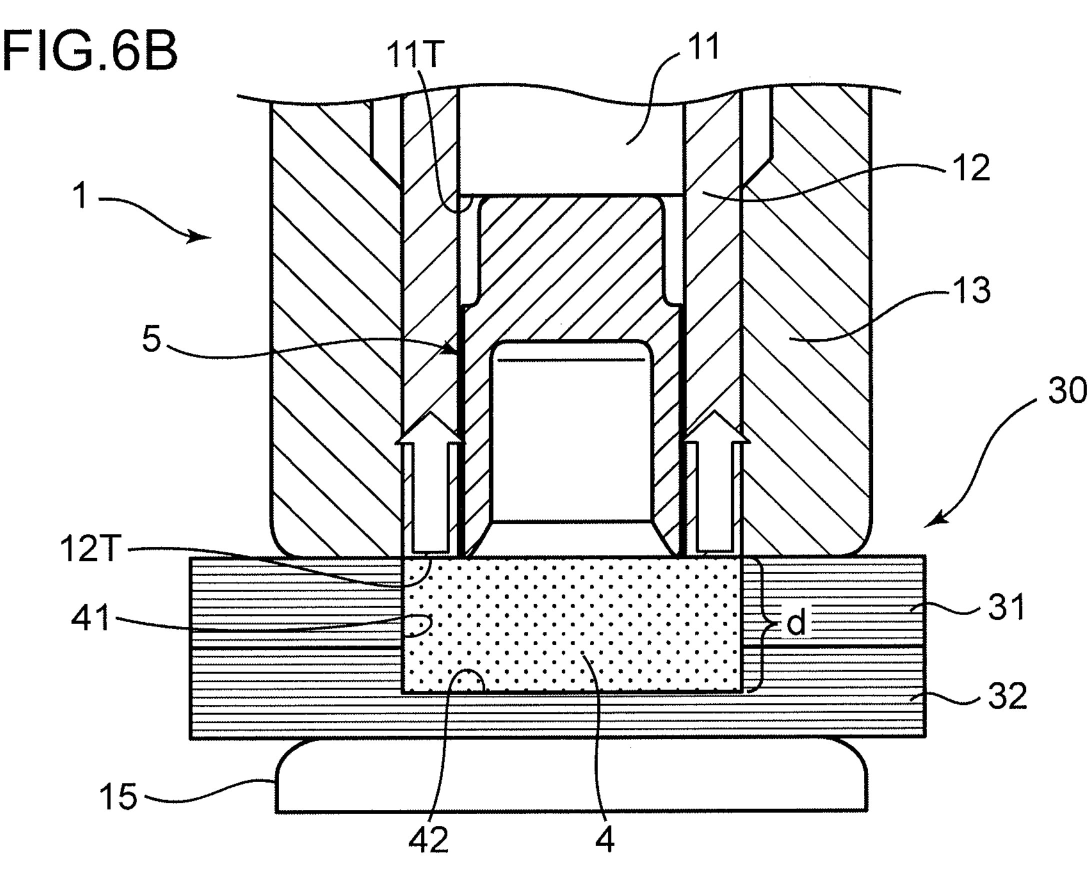
FIG. 6B is a cross-sectional view illustrating an implementation status of a friction stirring process.

FIGS. 6A and 6B are each a cross-sectional view illustrating an implementation status of a friction stirring process of process S3. FIG. 6A illustrates a state where the shoulder preceding process is applied to the tool 1, and the shoulder member 12 is press-fitted into the overlapping part 30. When the above-described alignment of the tool 1 with the overlapping part 30 is completed, the controller C controls the rotation driving unit 21 and the shoulder driving unit 23 to lower the shoulder member 12 while causing the shoulder member 12 to be rotated at a high speed about the axis, and starts press fitting of the shoulder member 12 into the overlapping part 30. The controller C also controls the pin driving unit 22 to retract the pin member 11 upward to release a resin material overflowed by the press fitting. The clamp member 13 is immovable. As a result, friction stirring is performed about the spot welding position W. The pin member 11 has already been moved upward to the extent that the accommodation space H is formed, so that the retracting of the pin member 11 may not be performed.

The shoulder member 12 has an indentation depth d corresponding to an indentation depth of the tool, i.e., the amount of lowering of the lower end part 12T from the upper surface 30U. The indentation depth d is set in accordance with the thickness t1 of the first member 31 and the thickness t2 of the second member 32. The indentation depth d is set to at least a depth that allows the shoulder member 12 to pass through the first member 31 and reach a part of the second member 32. Although described later with reference to FIG. 11A, the indentation depth d may be set to be less than the thickness t1 of the first member 31.

When the shoulder member 12 rotating at a high speed is press-fitted into the overlapping part 30, the material of the overlapping part 30 is subjected to friction stirring in a press-fitted region of the shoulder member 12. The material overflowing from the overlapping part 30 due to the press-fitting of the shoulder member 12 is released to the hollow part in the shoulder member 12. The friction stirring causes the material in the press-fitted region to be softened, thereby forming the friction stirred part 4 in the overlapping part 30. The friction stirred part 4 contains the continuous fibers 34 that are divided and pulverized. This state facilitates subsequent driving and deformation of the rivet 5.

FIG. 6B is a diagram illustrating a backfilling process of the overflow material in the friction stirring process of process S3. In the backfilling process, the shoulder driving unit 23 raises the shoulder member 12. When the pin member 11 is raised, the pin member is lowered. This operation causes the softened material to flow into the region occupied by the vicinity of the lower end part 12T of the shoulder member 12 in the friction stirred part 4. Thus, the material overflowing from the overlapping part 30 is also backfilled in the press-fitted region.

The above process S3 is performed to form the friction stirred part 4 including a cylindrical side peripheral surface 41 having the depth d and a bottom surface 42 in a disk shape in the overlapping part 30. While the material is softened in the friction stirred part 4, original hardness of the first member 31 and the second member 32 is maintained in the base material part around the friction stirred part 4, and reinforcing structure with the continuous fibers 34 is also maintained.

Figure 7A:
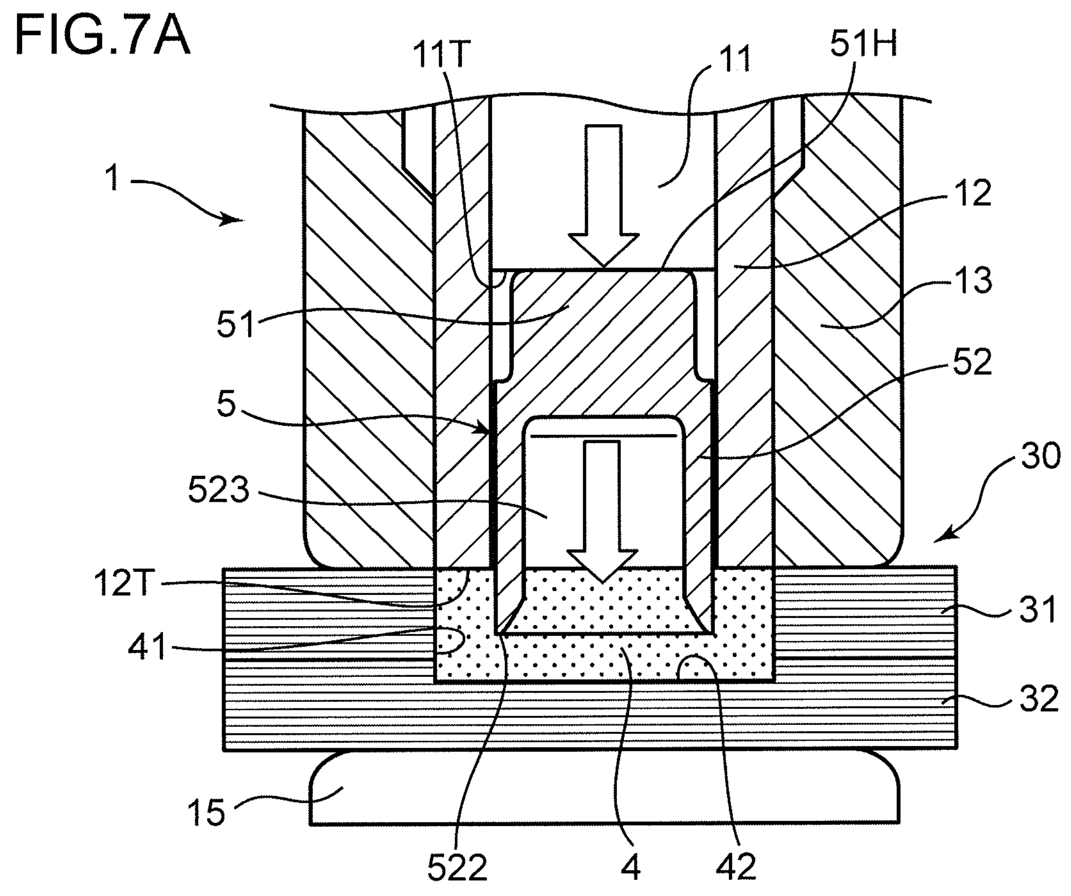
FIG. 7A is a cross-sectional view illustrating a driving process of a rivet.

FIG. 7A is a cross-sectional view illustrating an implementation status of the rivet driving process of process S4. Process S4 is performed to press-fit the rivet 5 into the friction stirred part 4 from the first member 31 side. The present embodiment allows the tool 1 for friction stir spot welding to be used as a tool for press-fitting the rivet 5. Thus, the joining method of the present embodiment can be performed without separately preparing a tool for driving the rivet 5.

The rivet driving process is specifically performed to cause the pin driving unit 22 to lower the pin member 11 to apply a press-fitting force to the head part 51, thereby pressing the rivet 5 into the overlapping part 30. The rivet 5 is preliminarily loaded in the accommodation space H such that the top surface 51H of the head part 51 faces the lower end part 11T of the pin member 11. Thus, when the pin member 11 is lowered, the rivet 5 is also lowered to penetrate into the friction stirred part 4 from a lower end part 522 of the rivet 5. The rivet driving process is desirably performed before the material of the friction stirred part 4 is cured.

Figure 7B:
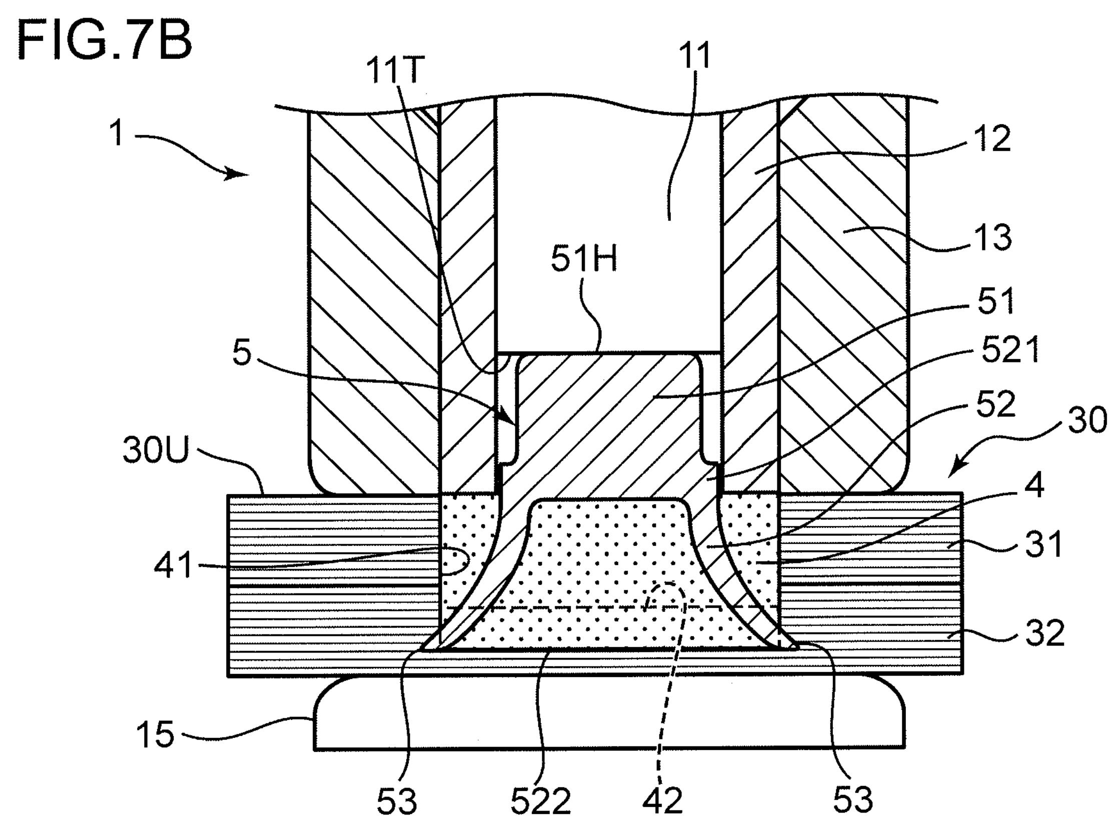
FIG. 7B is a cross-sectional view illustrating an implementation status of a forming process of an interlock part.

FIG. 7B is a cross-sectional view illustrating an implementation status of the forming process of an interlock part of process S5. Process S5 is performed to deform the rivet 5 after the rivet 5 reaches the second member 32 so that the rivet 5 partly penetrates into the base material part around the friction stirred part 4 in the second member 32 to form an interlock part 53. The interlock part 53 according to the present embodiment is formed by deforming the shaft part 52 having a cylindrical shape into a bell shape in which the lower end part 522 is enlarged in diameter and press-fitting the enlarged lower end part 522 into the base material part.

When the rivet 5 is continuously pressed down by the pin member 11 from the state of FIG. 7A, the lower end part 522 of the rivet 5 eventually reaches the bottom surface 42 of the friction stirred part 4. The base material part is located below the bottom surface 42 and is not softened. The overlapping part 30 is supported by the backup member 15 at a position immediately below the bottom surface 42. Additionally, tapering is applied to near the lower end part 522 of the shaft part 52 to gradually increase an inner diameter of the hollow region 523, thereby sharpening the lower end part 522.

Thus, when the rivet 5 is further continuously pressed down by the pin member 11 after the lower end part 522 reaches the bottom surface 42, the shaft part 52 is deformed into a bell shape as illustrated in FIG. 7B. That is, the lower end part 522 is not only press-fitted into the base material part below the friction stirred part 4 beyond the bottom surface 42, but also radially enlarged in diameter and press-fitted into the base material part lateral to the friction stirred part 4 beyond the side peripheral surface 41. The lower end part 522 includes a part press-fitted into the base material part beyond the side peripheral surface 41, the part serving as the interlock part 53 that exerts an anchor effect in the vertical direction in which the first member 31 is peeled from the second member 32. The shaft part 52 of the rivet 5 may be deformed before reaching the second member 32. For example, the shaft part 52 may be deformed such that the shaft part 52 gradually starts to expand and deform in a region of the first member 31 after being press-fitted into the friction stirred part 4, and the shaft part further expands and deforms after reaching the bottom surface 42.

Process S6 is performed as necessary to crush the head part 51 of the rivet 5. Process S6 is performed to further apply a downward pressing force to the head part 51 from the state of FIG. 7B. When process S5 is completed, the head part 51 protrudes upward from the upper surface 30U of the overlapping part 30. The head part 51 has a smaller radial size than the upper end part 521 of the shaft part 52. The pressing force is applied to the head part 51 as described above to deform the head part so that the head part is enlarged in diameter to a size to be engaged with an upper surface of the friction stirred part 4 or a size to be engaged with the upper surface 30U of the overlapping part 30 (first member 31).

The tool 1 can be directly used as a tool used for crushing the head part 51 in process S6. In this case, the pin member 11 is further lowered from the state of FIG. 7B, and the shoulder member 12 is raised to secure a deformation allowance of the head part 51. Alternatively, another pressing tool capable of crushing the head part 51 may be used.

The joining method according to the first embodiment described above enables the overlapping part 30 to be joined to have excellent joining strength by using the friction stirring with the tool 1 and the rivet 5 in combination. That is, the overlapping part 30 is provided with the friction stirred part 4 into which the rivet 5 is press-fitted later. The friction stirred part 4 is formed in which constituent materials of the first member 31 and second member 32 are kneaded by friction stirring and the constituent materials are softened.

The friction stirred part 4 as described above has an alleviated inhibiting factor of deformation of the rivet 5. For example, when the constituent materials are insufficiently softened, or contain a reinforcing material or a filler, the rivet 5 is less likely to be deformed as intended. The friction stirred part 4 eliminates this difficulty, so that the rivet 5 is likely to have an original deformation due to press-fitting. Thus, the lower end part 522 of the shaft part 52 of the rivet 5 can be smoothly inserted into a base material part of the second member 32. As a result, the interlock part 53 is reliably formed, and the joined body 3 having high strength can be obtained.

In particular, the first member 31 and the second member 32 according to the present embodiment are each formed of the sheet laminate 33 in which thermoplastic resin sheets containing the continuous fibers 34 as reinforcing fibers are laminated in multiple layers as illustrated in FIG. 2. When such members are joined to each other by press-fitting of the rivet 5, the continuous fibers 34 are entangled to inhibit deformation of the rivet 5. Thus, the rivet 5 may not form the interlock part 53 that exerts an anchor effect on the overlapping part 30. In contrast, the above joining method allows the rivet 5 to be driven into the friction stirred part 4 in which the continuous fibers 34 are divided by friction stirring and the thermoplastic resin is softened. Thus, the rivet 5 can have an original deformation in the friction stirred part 4, so that the lower end part 522 can be easily penetrated into the base material part around the friction stirred part 4. As a result, the interlock part 53 exerting the anchor effect can be formed.

Additionally, the rivet 5 is press-fitted into the friction stirred part 4 using the tool 1 for friction stir spot welding as it is. Thus, no dedicated tool for driving the rivet 5 is required to be prepared separately. Then, the shoulder member 12 performs friction stirring with the rivet 5 preliminarily loaded in the tool 1, and subsequently the pin member 11 press-fits the rivet 5. Thus, the press-fitting of the rivet 5 from the friction stirring can be smoothly performed in a flow process.

[Structure of Joined Body]

Figure 8A:
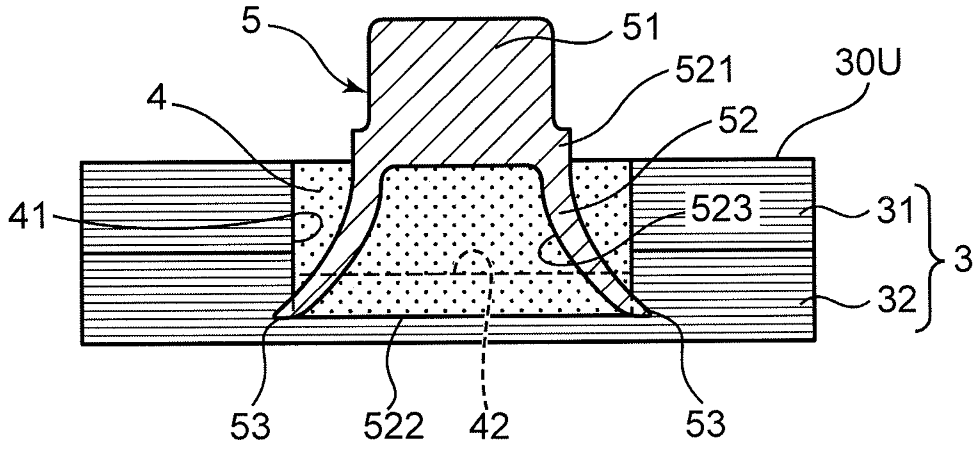
FIG. 8A is a cross-sectional view of a joined body formed by a joining method.

FIG. 8A is a cross-sectional view illustrating the joined body 3 of the first member 31 and the second member 32 formed by the joining method of the present embodiment. The joined body 3 illustrated here is in a state corresponding to a state after completion of process S5 illustrated in FIG. 7B, that is, a state in which process S6 is not performed.

The joined body 3 includes the overlapping part 30, the friction stirred part 4, the rivet 5, and the interlock part 53. The overlapping part 30 is formed with the first member 31 and the second member 32 that overlap each other, the first member 31 being disposed on an upper side, i.e., one end side in an overlapping direction, and the second member 32 being disposed on a lower side, i.e., the other end side in the overlapping direction. The friction stirred part 4 is provided in the overlapping part 30, and is formed passing through the first member 31 in the vertical direction and reaching a part of the second member 32. The rivet 5 is driven to be embedded in the friction stirred part 4. Then, the shaft part 52 of the rivet 5 actually penetrates into the friction stirred part 4. As described above, the shaft part 52 has the shape of a bell and gradually increases in inner diameter from the upper end part 521 to the lower end part 522.

The interlock part 53 is a part near the lower end part 522 that is a lower end region of the shaft part 52, the part being deformed to protrude radially outward from the side peripheral surface 41 of the friction stirred part 4 in the second member 32, and to penetrate into the base material part around the side peripheral surface 41. When viewed in the vertical direction, the interlock part 53 penetrates into the base material part below the bottom surface 42. The hollow region 523 of the shaft part 52 is filled with a friction-stirred material subjected to the friction stirring.

The joined body 3 having the above structure first applies a joining force to the overlapping part 30 with the friction stirred part 4. That is, the friction stirred part 4 passes through the first member 31 and reaches a depth of about an upper half of the second member 32, and contributes as a joining element between the first member 31 and the second member 32. The interlock part 53 of the rivet 5 also applies a joining force to the overlapping part 30. The interlock part 53 is configured to penetrate into the base material part of the second member 32 present laterally to the side peripheral surface 41 through the friction stirred part 4. As a result, the friction stirred part 4 in which the rivet 5 is driven and the base material part can be firmly engaged by the anchor effect exerted by the interlock part 53 without depending only on friction stir welding. Thus, the joined body 3 of the present embodiment has excellent joint strength.

Figure 8B:
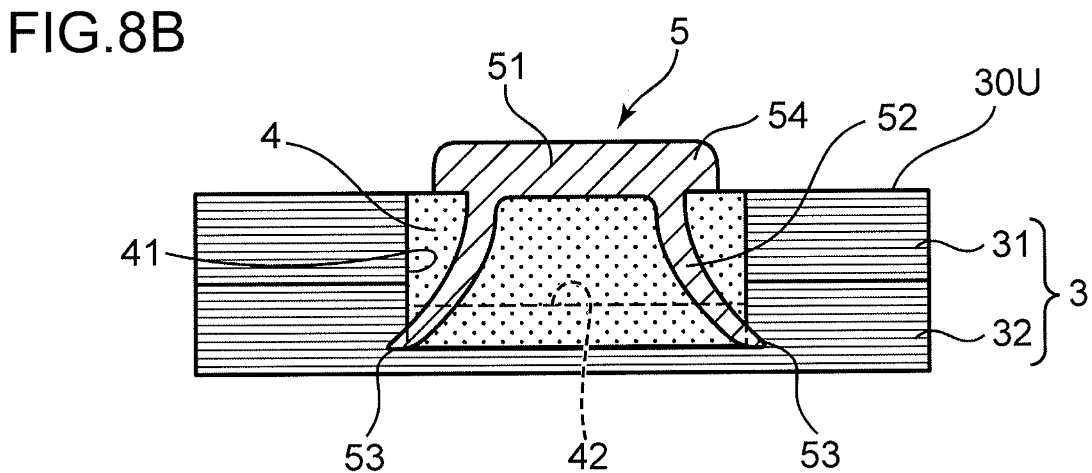
FIG. 8B is a cross-sectional view of a joined body formed by a joining method.

FIG. 8B is a cross-sectional view illustrating the joined body 3 constructed through the crushing process of a rivet head part of process S6 described above. The head part 51 to which the press-fitting force is applied in the driving process of process S4 is crushed and deformed into a shape rolled into a substantially disk shape. The head part 51 has a flange part 54 engaged with the upper surface of the friction stirred part 4. Although the head part 51 is originally smaller in diameter than the shaft part 52, the head part 51 is deformed to be larger in diameter than the shaft part 52 by performing the crushing process of process S6. The head part 51 has a part extending radially outward from the shaft part 52, the part serving as the flange part 54. The flange part 54 has a lower surface in contact with the upper surface of the friction stirred part 4.

The joined body 3 having the flange part 54 as described above is configured such that the friction stirred part 4 is sandwiched between the interlock part 53 and the flange part 54. That is, a structure is fabricated in which the upper surface of the friction stirred part 4 is engaged with the flange part 54 with the interlock part 53 as a holding base point, the interlock part 53 exerting a strong anchor effect by being press-fitted into the base material part of the second member 32. This structure enables enhancing fixability of the friction stirred part 4 to the overlapping part 30 to obtain the joined body 3 excellent in stability.

Figure 8C:
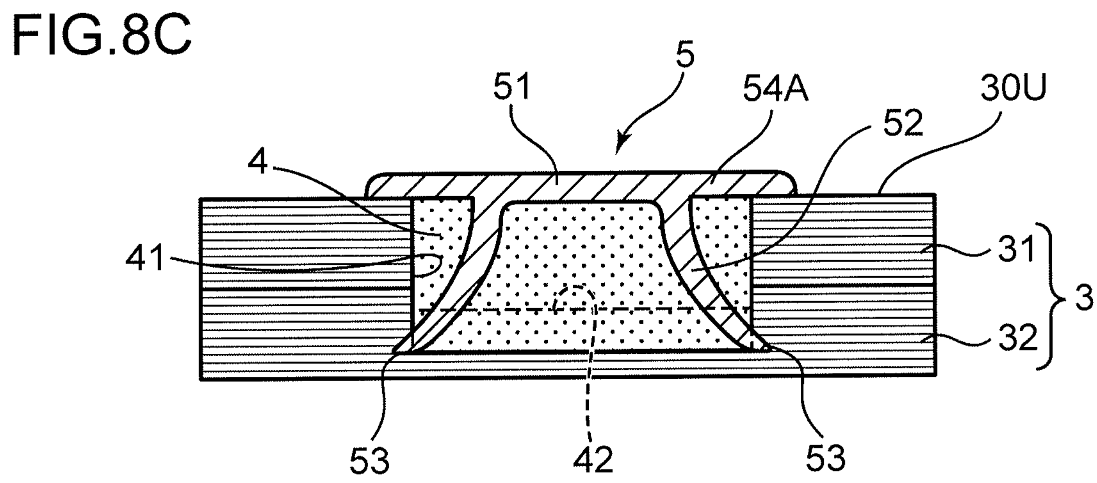
FIG. 8C is a cross-sectional view of a joined body formed by a joining method.

FIG. 8C is a cross-sectional view illustrating the joined body 3 that is also manufactured through the crushing process of process S6. The head part 51 illustrated here is rolled to be larger in diameter than that illustrated in FIG. 8B. The head part 51 includes a flange part 54A having a size beyond the friction stirred part 4, the size allowing the flange part 54A to engage with an upper surface of the first member 31 around a peripheral edge around the friction stirred part 4. The joined body 3 including the flange part 54A as described above is configured to sandwich the friction stirred part 4 between the interlock part 53 penetrating into the base material part of the second member 32 and the flange part 54A engaging with the upper surface of the base material part of the first member 31. This structure enables further enhancing fixability of the friction stirred part 4 to the overlapping part 30 to obtain the joined body 3 more excellent in stability.

Joining Method According to Second Embodiment

Figure 9:
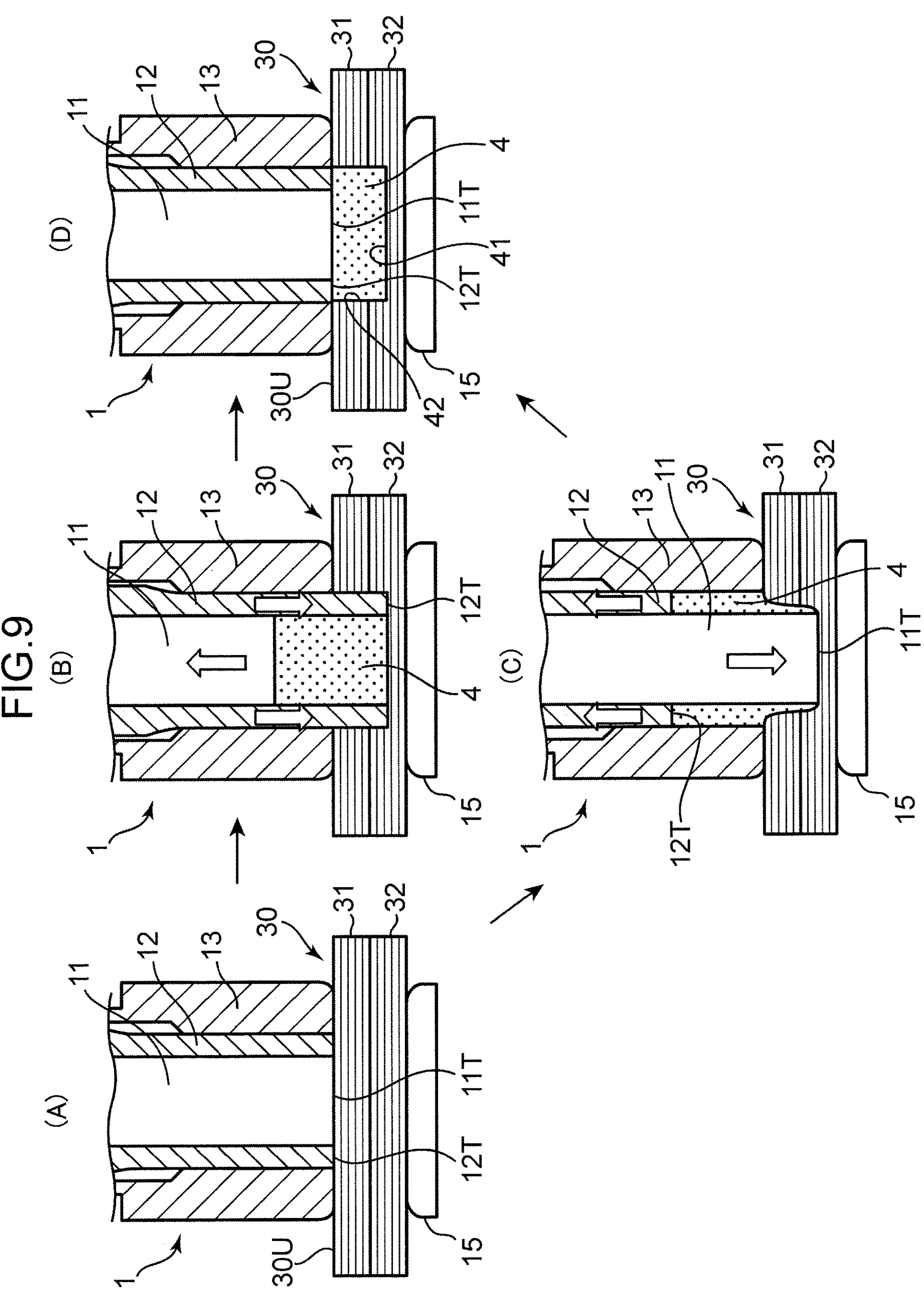
FIG. 9 illustrates a cross-sectional view of an implementation status of each of processes (A) to (D) of a joining method according to a second embodiment.
Figure 10:
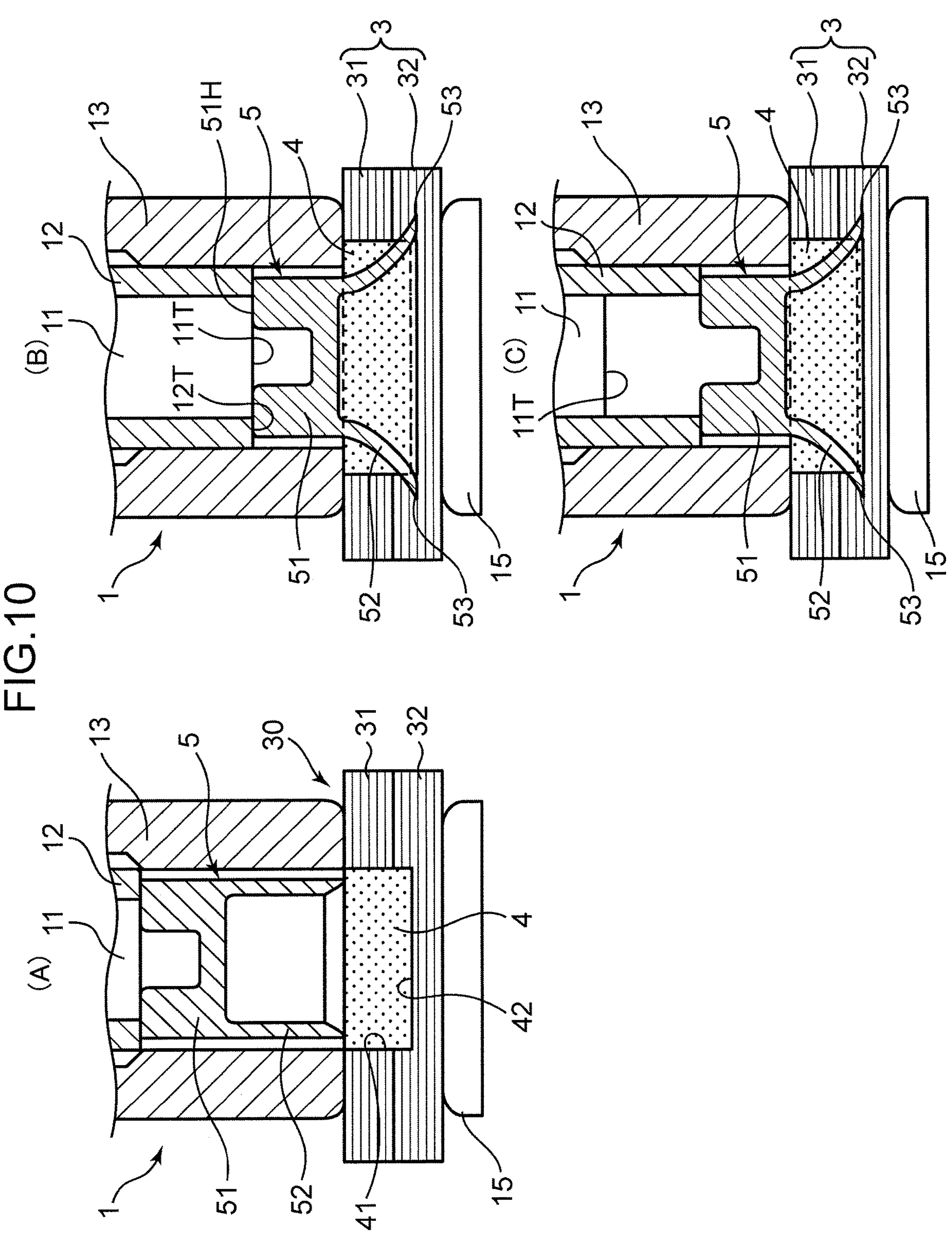
FIG. 10 illustrates a cross-sectional view of an implementation status of each of processes (A) to (C) of the joining method according to the second embodiment.

FIGS. 9 and 10 are cross-sectional views sequentially illustrating implementation statuses of the joining method according to a second embodiment. The second embodiment is different from the first embodiment in that process S1 in FIG. 3, which is a preparation process of preliminarily loading a rivet 5 to be driven into a tool 1, is not performed. Thus, there is an advantage in that degrees of freedom of operation of friction stirring using the tool 1 and operation of press-fitting the rivet 5 can be increased.

FIG. 9 illustrates process (A) showing an implementation status of a forming process of an overlapping part 30. The overlapping part 30 is formed in which a first member 31 and a second member 32 overlap each other in the vertical direction while being in contact with each other. The tool 1 is disposed on an upper surface 30U side of the overlapping part 30. The first member 31 is disposed on a side where the tool 1 is press-fitted first, and the second member 32 is disposed on a side where the tool 1 is press-fitted last. The overlapping part 30 has a lower surface supported by a backup member 15. The tool 1 has a lower end surface including lower end parts 12T and 13T that are in contact with the upper surface 30U of the overlapping part 30. The overlapping part 30 is pressed by a clamp member 13 against the backup member 15 with a biasing force of the spring 14 illustrated in FIG. 1A.

FIG. 9 illustrates process (B) showing a state in which friction stirring is performed on the overlapping part 30 by a shoulder preceding process. The friction stirring is performed by press-fitting a shoulder member 12 into the overlapping part 30. On the other hand, a pin member 11 is retracted upward to release a material overflowing from the overlapping part 30. The lower end part 12T of the shoulder member 12 has a press-fitting depth that allows the lower end part 12T to pass through the first member 31 and penetrate into almost the middle of the second member 32 in its thickness direction.

This friction stirring process may be performed in a pin preceding process. FIG. 9 illustrates process (C) showing a state in which friction stirring is performed on the overlapping part 30 by the pin preceding process. The pin member 11 is press-fitted into the overlapping part 30 to perform the friction stirring. Then, the shoulder member 12 is retracted upward to release a material overflowing from the overlapping part 30. The pin member 11 includes a lower end part 11T that similarly has a press-fitting depth allowing the lower end part 11T to pass through the first member 31 and penetrate into almost the middle of the second member 32 in its thickness direction.

FIG. 9 illustrates process (D) showing a state in which a backfilling process in the friction stirring process is performed following the press-fitting of the shoulder member 12 in process (B). The lower end part 12T of the shoulder member 12 press-fitted into the overlapping part 30 and the lower end part 11T of the pin member 11 retracted upward are each returned to a height position of the upper surface 30U. As a result, a friction stirred part 4 having a side peripheral surface 41 and a bottom surface 42 is formed in the overlapping part 30. When the pin preceding process of process (C) is applied, the pin member 11 is raised and the shoulder member 12 is lowered in the backfilling process.

Process (A) in FIG. 10 shows a process of setting the rivet 5 in the tool 1. Both the pin member 11 and the shoulder member 12 of the tool 1 are raised by a height of the rivet 5. This raising generates a cylindrical space inside the clamp member 13 to allow the rivet 5 to be accommodated in the cylindrical space. That is, the rivet 5 is disposed between a lower part of the pin member 11, or lower parts of the pin member 11 and the shoulder member 12, and the upper surface of the friction stirred part 4.

Process (B) in FIG. 10 shows a state in which the driving process of the rivet 5 and the forming process of an interlock part 53 are performed. Both the pin member 11 and the shoulder member 12 are lowered, and the lower end parts 11T and 12T press down a top surface 51H of the rivet 5. The shaft part 52 of the rivet 5 penetrates into the friction stirred part 4, and then the interlock part 53 penetrates into the base material part of the second member 32, the base material part existing around the friction stirred part 4.

Process (B) in FIG. 10 can be replaced with process (C) in FIG. 10. Process (C) in FIG. 10 shows a state in which only the shoulder member 12 is lowered to press down the rivet 5. Although not illustrated, only the pin member 11 may be lowered to press down the rivet 5. Alternatively, another press tool may be used in the driving process without using the tool 1. The driving process of the rivet 5 and the forming process of the interlock part 53 are desirably performed after the friction stirred part 4 is formed and before the friction stirred part 4 is solidified.

Joining Method According to Third Embodiment

Figure 11B:
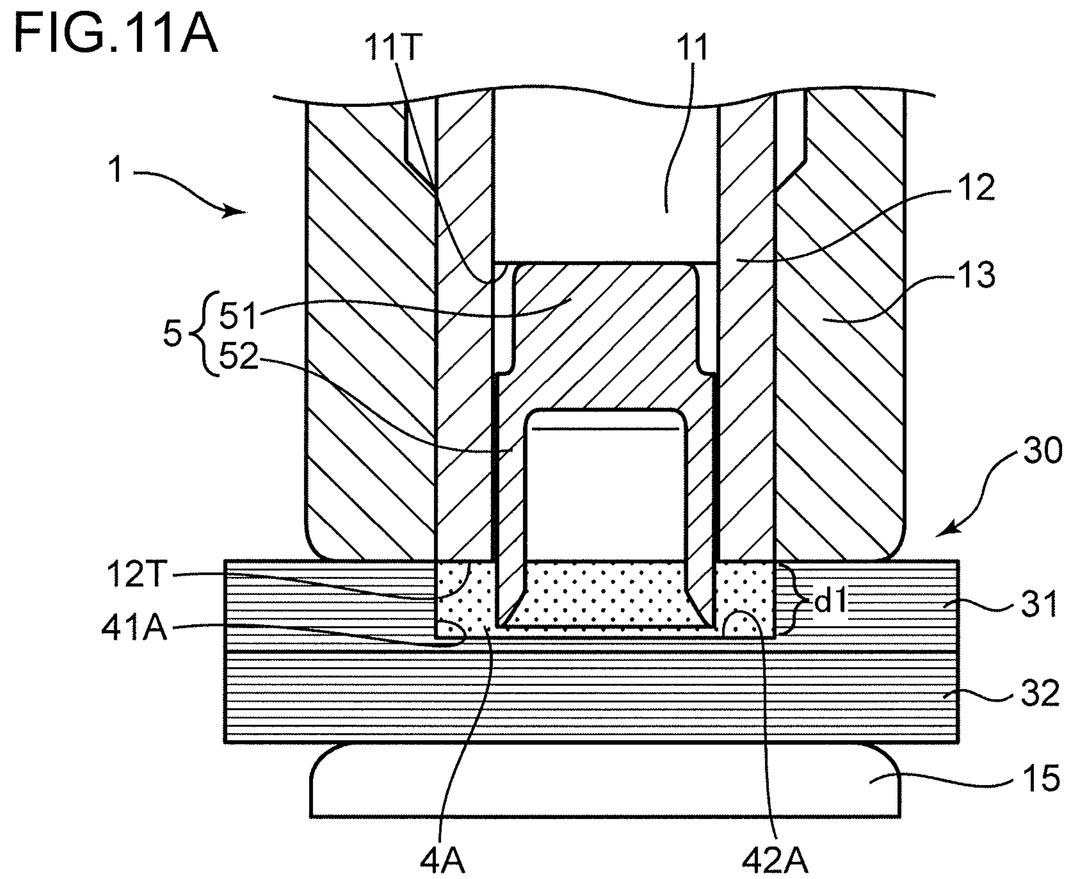
FIG. 11B is a cross-sectional view illustrating an implementation status of the joining method according to the third embodiment.

FIGS. 11A and 11B are cross-sectional views sequentially illustrating implementation statuses of the joining method according to a third embodiment. The first and second embodiments each show an example in which the friction stirred part 4 is formed with the indentation depth d at which the friction stirred part 4 passes through the first member 31 and reaches a part of the second member 32. As long as the rivet 5 reaches the second member 32 to form the interlock part 53, the friction stirred part 4 may not necessarily reach the second member 32. The third embodiment shows an example in which a friction stirred part 4A within a thickness range of the first member 31 is formed in the friction stirring process of process S3 in FIG. 3.

As illustrated in FIG. 11A, the friction stirred part 4A is formed with an indentation depth d1 in the overlapping part 30 of the first member 31 and the second member 32. The indentation depth d1 is slightly smaller than the thickness of the first member 31, and the friction stirred part 4A is formed only in a region of the first member 31. That is, the friction stirred part 4A includes a side peripheral surface 41A and a bottom surface 42A that exist within the thickness range of the first member 31. Then, the bottom surface 42A is located close to an upper surface of the second member 32, and a base material part of the second member 32 exists around the friction stirred part 4A. FIG. 11A illustrates a state in which the rivet 5 is press-fitted into the friction stirred part 4A by lowering a pin member 11 of a tool 1.

FIG. 11B illustrates a state in which the forming process of an interlock part of process S5 is completed. When the press-fitting of the rivet 5 into the friction stirred part 4A progresses from the state of FIG. 11A, the lower end part 522 of the shaft part 52 of the rivet 5 eventually reaches the bottom surface 42A of the friction stirred part 4A. When the press-fitting of the rivet 5 further progresses, the lower end part 522 penetrates into the second member 32 beyond the bottom surface 42A and radially enlarges in diameter. As a result, the shaft part 52 is deformed into a bell shape in which the lower end part 522 enlarges in diameter to form the interlock part 53 press-fitted into the base material part of the second member 32, the base material part not being subjected to friction stirring. The interlock part 53 exerts an anchor effect in a direction in which the first member 31 is peeled from the second member 32.

Joining Method According to Fourth Embodiment

The above embodiment shows an example in which the flange part 54 is formed by performing the crushing process shown in process S6 of FIG. 3 on the head part 51 of the rivet 5. Alternatively, the rivet 5 including a part corresponding to the flange part 54 may be used in advance. This aspect is exemplified in a fourth embodiment.

Figure 12A:
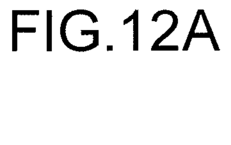
FIG. 12A is a longitudinal sectional view of a rivet according to a modification.

FIG. 12A is a longitudinal sectional view of a rivet 5A used in the fourth embodiment. The rivet 5A includes a head part 51A and a shaft part 52. The shaft part 52 includes an upper end part 521 connected to the head part 51A, and a lower end part 522 that is an open end of the shaft part 52 in a tubular shape. Unlike the rivet 5 illustrated in FIG. 4, the head part 51A has a larger diameter than the shaft part 52. A part with the larger diameter serves as a flange part 54A that engages with an upper surface of a friction stirred part 4.

Figure 12B:
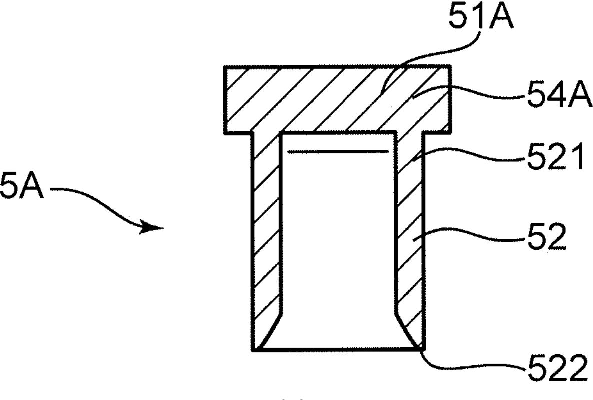
FIG. 12B is a cross-sectional view illustrating an implementation status of a joining method according to a fourth embodiment.
Figure 12B:
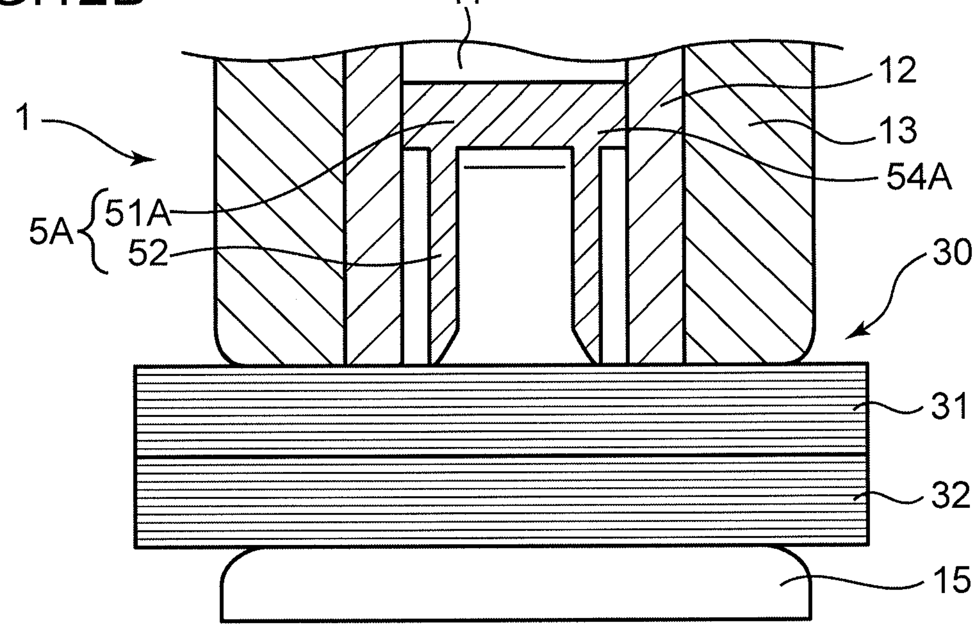
Figure 12C:
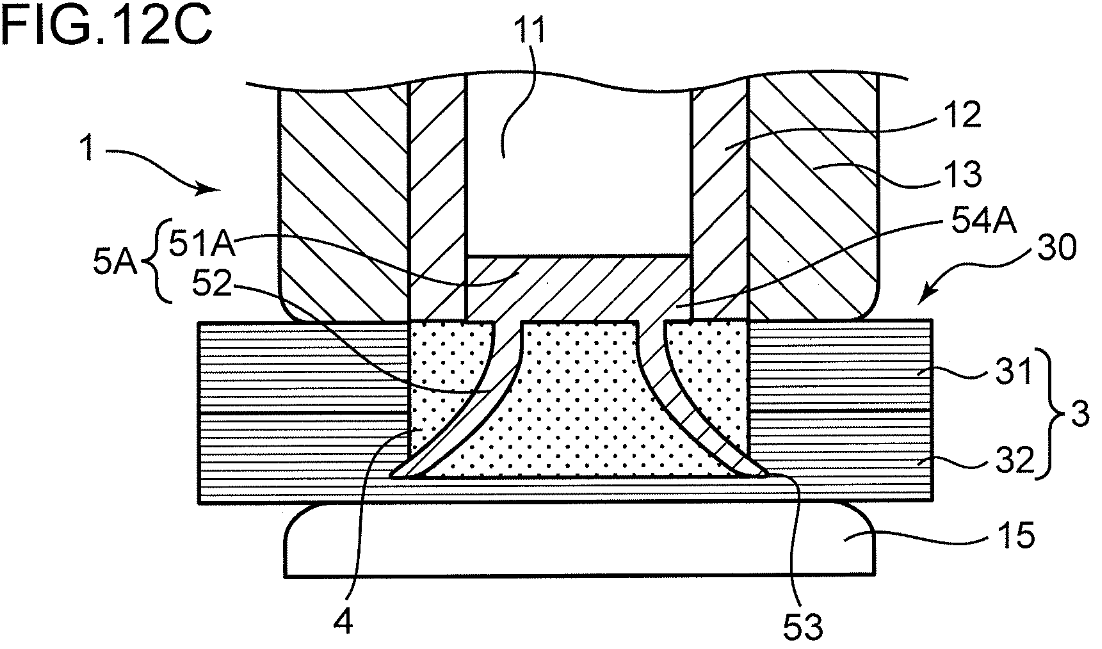
FIG. 12C is a cross-sectional view illustrating an implementation status of the joining method according to the fourth embodiment.

FIGS. 12B and 12C are each a cross-sectional view illustrating an implementation status of the joining method according to the fourth embodiment. FIG. 12B is a cross-sectional view illustrating a state in which the forming process of an overlapping part 30 of process S2 is completed. The state shows a tool 1 in which a pin member 11 is raised, and the rivet 5A is preliminarily accommodated in a hollow part of a shoulder member 12. The head part 51A of the rivet 5A has an outer diameter slightly smaller than an inner diameter of the hollow part of the shoulder member 12. Thereafter, the shoulder member 12 is press-fitted into the overlapping part 30 to form the friction stirred part 4.

FIG. 12C is a cross-sectional view illustrating an implementation status of the forming process of an interlock part of process S5. The pin member 11 is lowered to press down the head part 51A. The shaft part 52 of the rivet 5A is press-fitted into the friction stirred part 4 and deformed into a bell shape. As a result, an interlock part 53 press-fitted into a base material part of the second member 32 is formed at a lower end of the shaft part 52. Thereafter, the tool 1 is removed from the overlapping part 30.

A joined body 3 formed according to the fourth embodiment has substantially the same form as the joined body 3 illustrated in FIG. 8B. That is, the head part 51A includes the flange part 54A larger in diameter than the shaft part 52, the flange part 54A having a lower surface in contact with the upper surface of the friction stirred part 4. This results in obtaining the joined body 3 with a joint aspect in which the friction stirred part 4 is sandwiched between the interlock part 53 and the flange part 54A. The fourth embodiment enables the crushing process of a rivet head part of process S6 to be eliminated.

Joining Method According to Fifth Embodiment

A fifth embodiment shows an example of a joining method in which the rivet 5A exemplified in the fourth embodiment is used and a build-up processing is performed on a head part 51A. FIGS. 13A to 13C, and 14A are each a cross-sectional view illustrating an implementation status of the joining method according to the fifth embodiment. The fifth embodiment uses a tool 1A including a clamp member 13 having a lower end part 13T provided with a chamfered part 131 formed by chamfering an inner peripheral edge of the lower end part 13T.

Figure 13A:
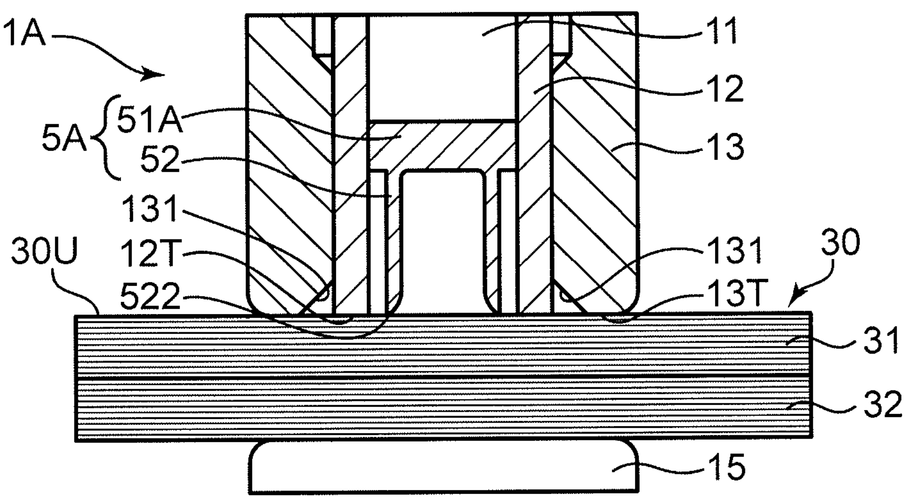
FIG. 13A is a cross-sectional view illustrating an implementation status of a joining method according to a fifth embodiment.

FIG. 13A is a cross-sectional view illustrating a state in which a forming process of an overlapping part 30 of a first member 31 and a second member 32 is completed. While a pin member 11 is raised and a rivet 5A is preliminarily accommodated in a hollow part of a shoulder member 12, the tool 1A is in contact with an upper surface of the overlapping part 30. The chamfered part 131 is formed at the lower end part 13T of the clamp member 13, so that an annular space exists around an outer periphery of a lower end part 12T of the shoulder member 12.

Figure 13B:
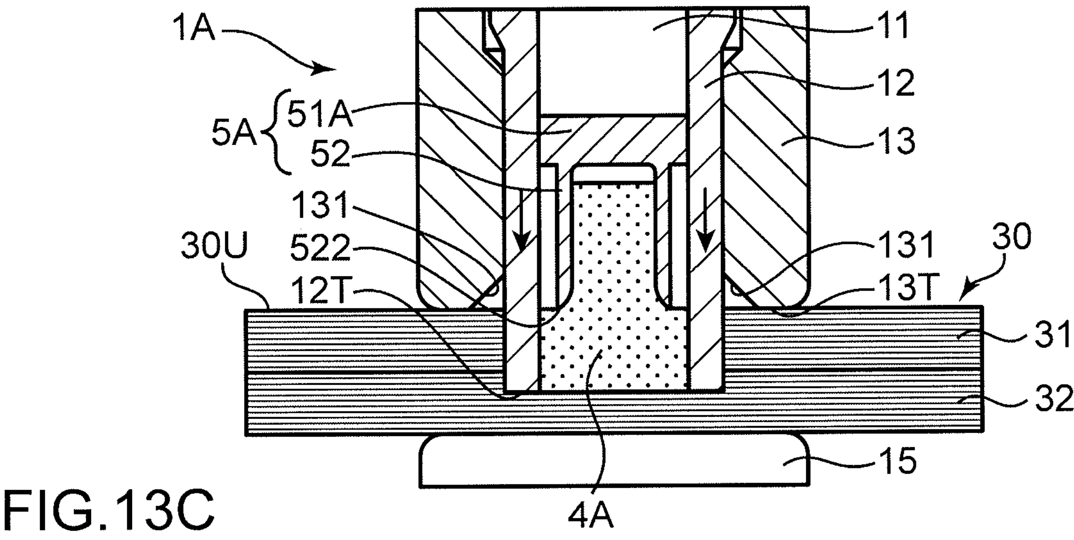
FIG. 13B is a cross-sectional view illustrating an implementation status of the joining method according to the fifth embodiment.
Figure 13C:
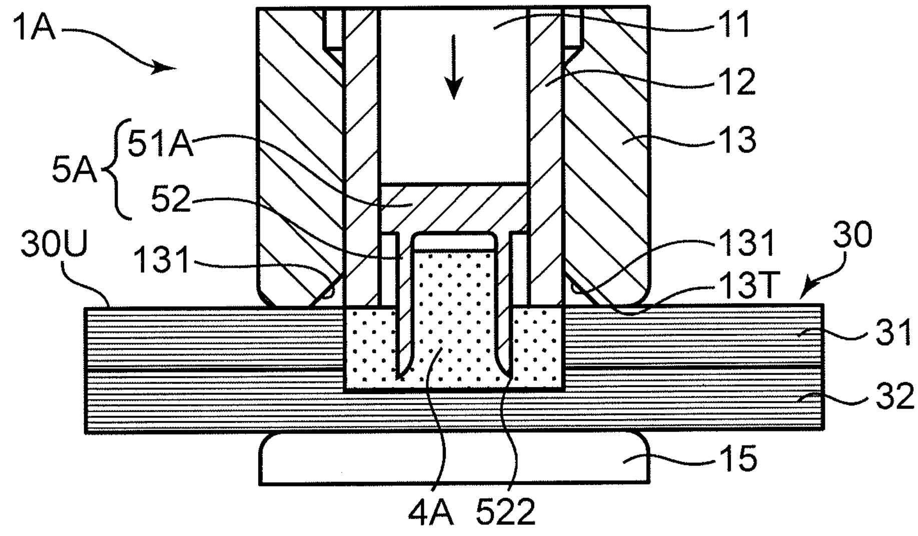
FIG. 13C is a cross-sectional view illustrating an implementation status of the joining method according to the fifth embodiment.

FIG. 13B illustrates a friction stirring process of the tool 1A. The shoulder member 12 is press-fitted into the overlapping part 30 to form a friction stirred part 4A. Here, an example is illustrated in which the lower end part 12T of the shoulder member 12 passes through the first member 31 and is press-fitted up to an upper layer part of the second member 32. FIG. 13C illustrates a state in which a driving process of a rivet of lowering the pin member 11 to press-fit the rivet 5A into the friction stirred part 4A is performed after the shoulder member 12 is retracted from the overlapping part 30 to perform a backfilling process of the friction stirred part 4A.

Figure 14A:
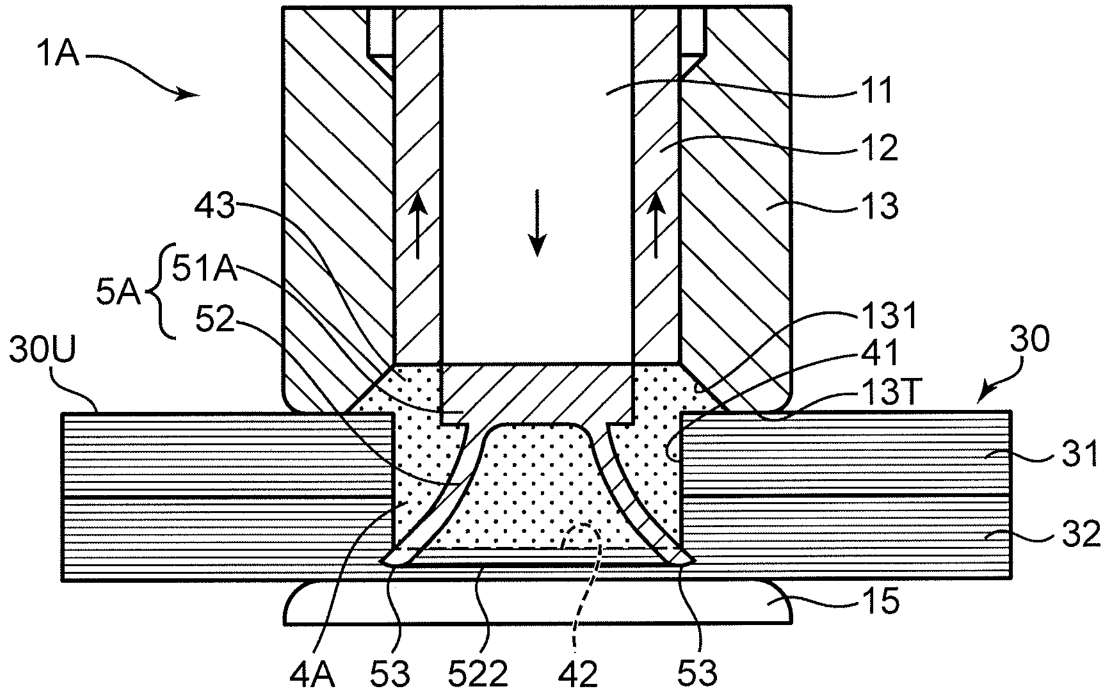
FIG. 14A is a cross-sectional view illustrating an implementation status of the joining method according to the fifth embodiment.

FIG. 14A illustrates a state in which the pin member 11 is further lowered to allow press-fitting of the rivet 5A into the friction stirred part 4A to proceed, and thus a lower end part 522 of a shaft part 52 is enlarged in diameter to form an interlock part 53. At this time, the lower end part 12T of the shoulder member 12 located at the same height position as an upper surface 30U of the overlapping part 30 is raised by a predetermined height. This operation causes the space around the chamfered part 131 to be filled with a softened material of the friction stirred part 4A.

Figure 14B:
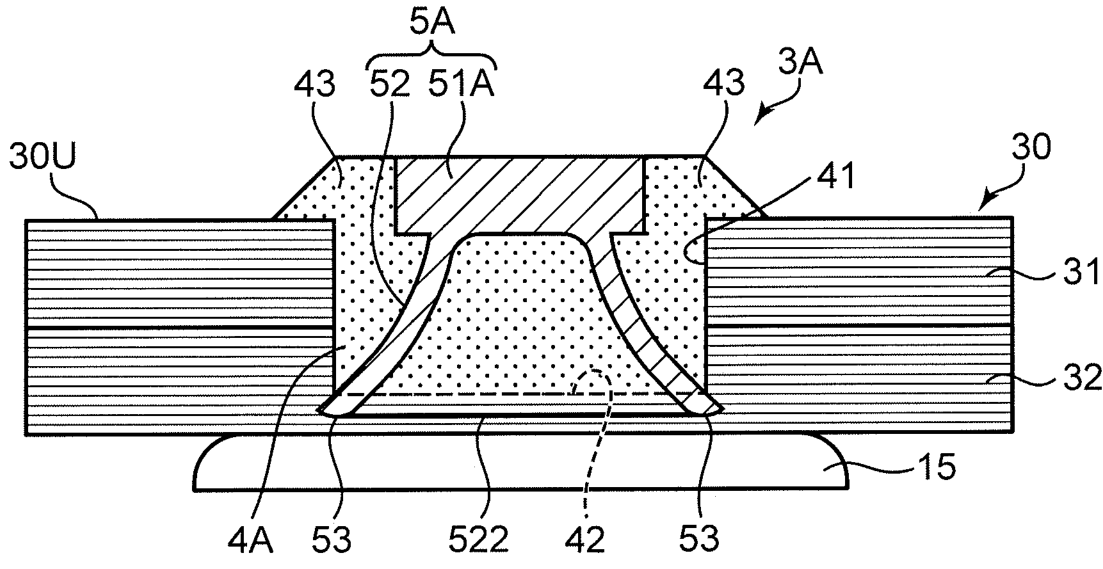
FIG. 14B is a cross-sectional view of a joined body obtained according to the fifth embodiment.

FIG. 14B is a cross-sectional view of a joined body 3A obtained by the joining method of the fifth embodiment described above. The joined body 3A includes the friction stirred part 4A having a build-up part 43. The build-up part 43 is equal in height to the head part 51A of the rivet 5A to cover a side periphery of the head part 51A. The build-up part 43 may be different in height from the head part 51A of the rivet 5A. The build-up part 43 has an outer peripheral part in a tapered shape along a chamfered shape of the chamfered part 131. The joined body 3A has a form in which the build-up part 43 engages with the upper surface 30U of the overlapping part 30. This form enables fabricating a structure in which a side peripheral surface 41 of the friction stirred part 4A is less likely to be broken from the base material part of the overlapping part 30.

Joining Method According to Sixth Embodiment

Figure 17:
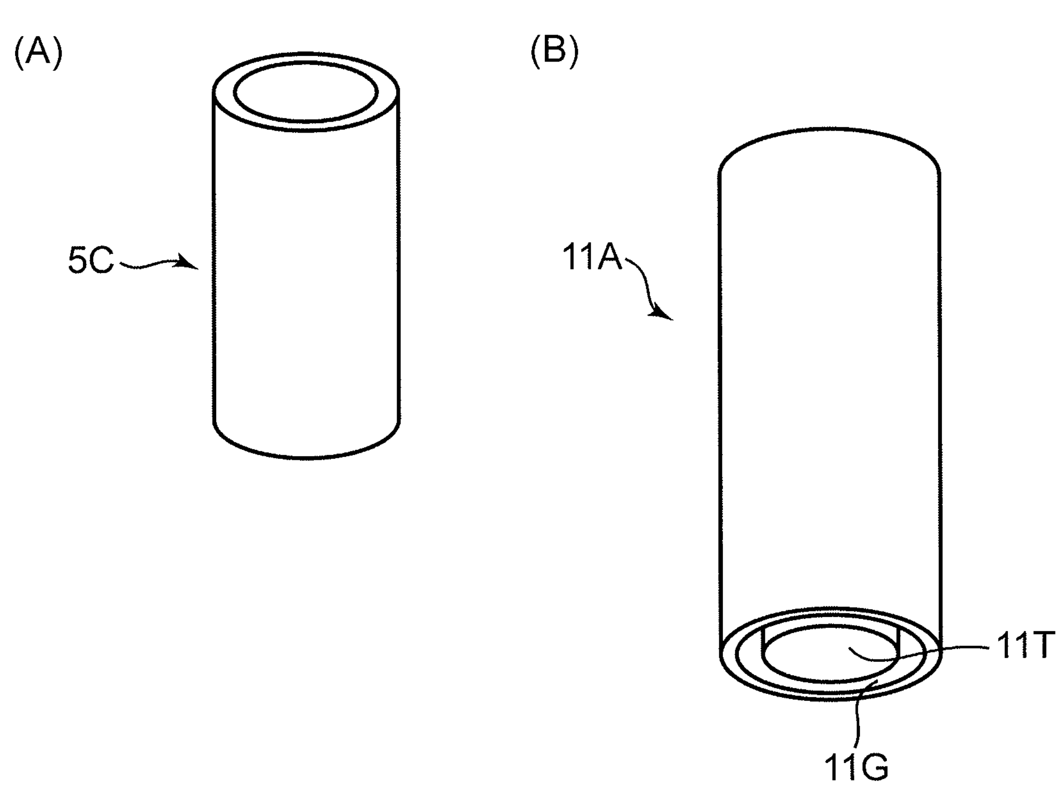
FIGS. 17(A) and 17(B) are each a perspective view of a cylindrical rivet and a pin member used in a joining method according to a sixth embodiment.
FIG. 17(C) is a cross-sectional view illustrating an implementation status of the joining method according to the sixth embodiment.
Figure 17:
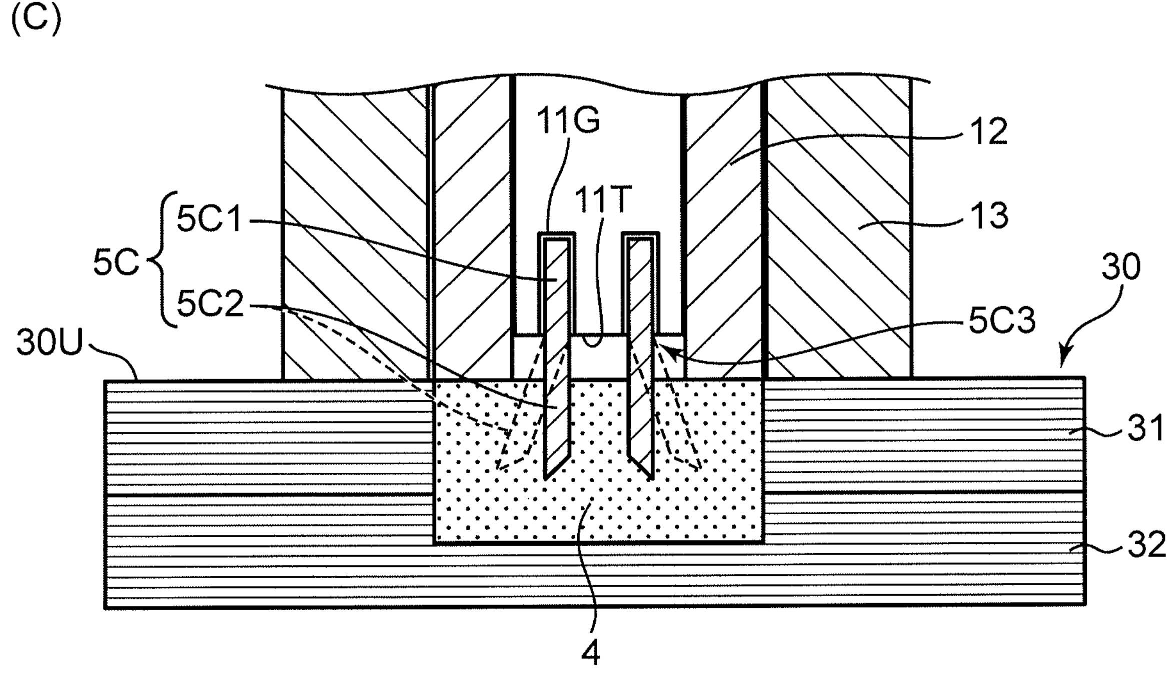

A sixth embodiment shows an example using a rivet in a simple cylindrical shape at low cost. FIGS. 17(A) and 17(B) are perspective views of a cylindrical rivet 5C and a pin member 11A, respectively, which are used in a joining method according to the sixth embodiment. FIG. 17(C) is a cross-sectional view illustrating an implementation status of the joining method according to the sixth embodiment.

The cylindrical rivet 5C (fastener) is a rivet in a cylindrical shape having a constant inner diameter before being press-fitted into a friction stirred part 4. The pin member 11A is provided in its lower end part 11T with an annular groove 11G in which a part of the cylindrical rivet 5C can be accommodated. The annular groove 11G opens in a lower end surface of the pin member 11A and extends by a predetermined length in an axial direction of the pin member 11A, and has a groove width allowing the cylindrical rivet 5C to be accommodated with a slight gap.

The cylindrical rivet 5C having a simple cylindrical shape is easy to be processed, so that the cylindrical rivet 5C can be procured at low cost, and thus the rivet 5C can contribute to cost reduction of a friction stir welded part. However, the cylindrical rivet 5C is not divided into a head part 51 and a shaft part 52 unlike the rivet 5 described above. This structure may cause an unstable position of a curvature starting point where a leading end on a press-fitting side of the cylindrical rivet 5C starts expanding and deforming. The unstable position of a curvature starting point may cause insufficient expansion, buckling, and a problem that the interlock part 53 is not formed well.

In view of the above problem, the sixth embodiment causes the pin member 11A to be lowered to press the cylindrical rivet 5C into the friction stirred part 4 while an upper region of the cylindrical rivet 5C is fitted in the annular groove 11G. As illustrated in FIG. 17(C), the cylindrical rivet 5C includes the upper region treated as a fitted part 5C1, and a lower region treated as a press-fitting part 5C2. Then, while the fitted part 5C1 is fitted in the annular groove 11G, the pin member 11A is lowered to press-fit the press-fitting part 5C2 into the friction stirred part 4. The fitted part 5C1 may have an axial length that is about ¼ to ½ of an entire length of the cylindrical rivet 5C. During press-fitting, an upper end edge of the cylindrical rivet 5C is in contact with a back wall of the annular groove 11G.

The fitted part 5C1 of the cylindrical rivet 5C is supported by fitting into the annular groove 11G, so that the fitted part 5C1 serves as a region that is not deformed. In contrast, the press-fitting part 5C2 protrudes from the lower end part 11T, and thus is not supported to serve as a deformable region. In this case, stress is most concentrated on a boundary between the fitted part 5C1 and the press-fitting part 5C2, so that the boundary serves as a curvature starting point 5C3. That is, the press-fitting part 5C2 is deformed expanding from the curvature starting point 5C3 as indicated by a dotted line in FIG. 17(C). After the press-fitting, the pin member 11A is separated from the overlapping part 30, and the fitted part 5C1 protruding from the friction stirred part 4 is crushed by an appropriate tool so as to expand radially outward.

The sixth embodiment uses the rivet 5C in a simple cylindrical shape, so that cost for forming the friction stir welded part can be reduced. Even when the cylindrical rivet 5C is used, the press-fitting part 5C2 can stably start curving and deforming at the curvature starting point 5C3. Thus, the interlock part 53 can be reliably formed.

Joining Method According to Seventh Embodiment

Figure 18:
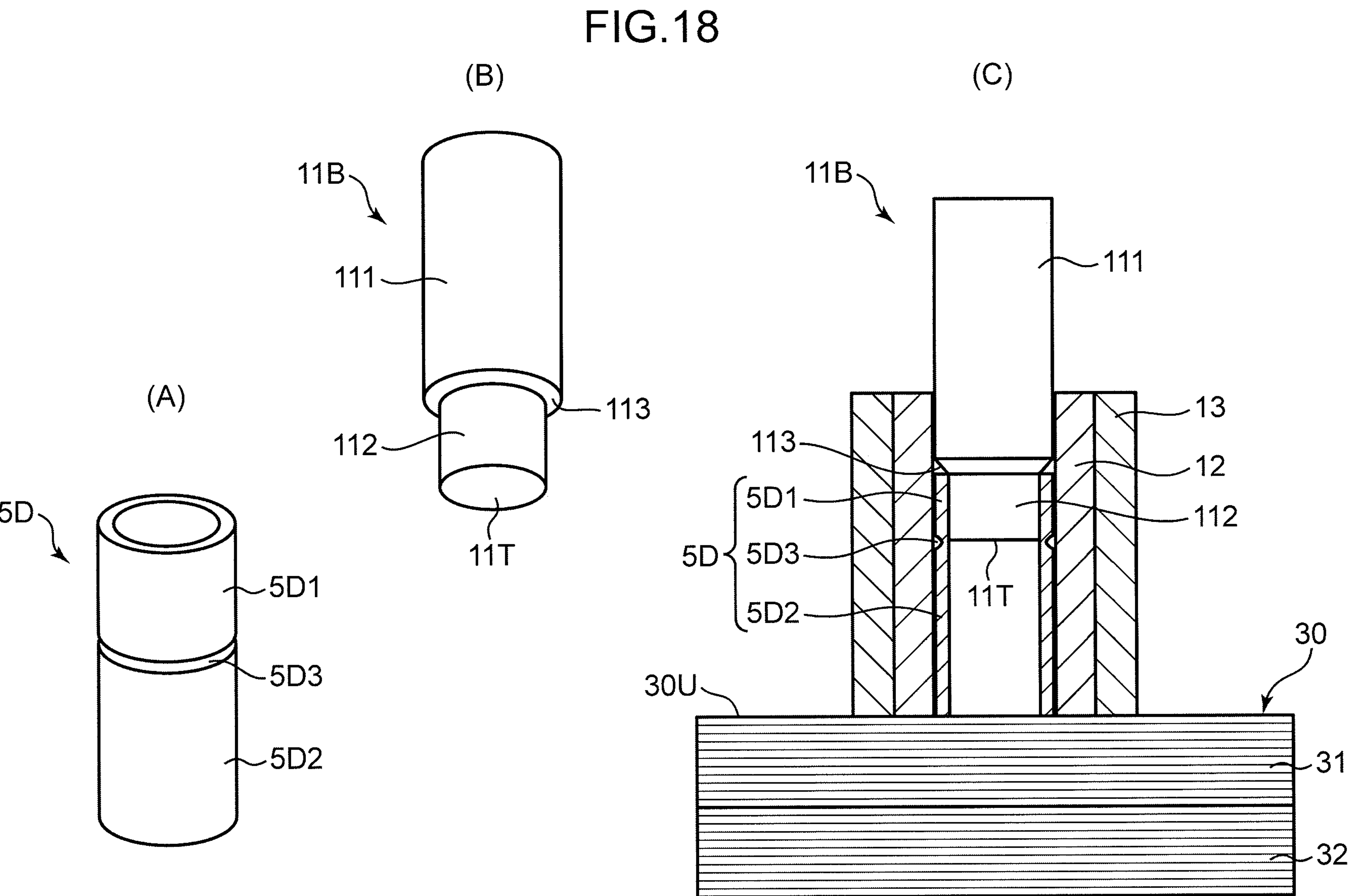
FIGS. 18(A) and 18(B) are each a perspective view of a cylindrical rivet and a pin member used in a joining method according to a seventh embodiment.
FIG. 18(C) is a cross-sectional view illustrating a preparation status of the joining method according to the seventh embodiment.

A seventh embodiment shows an example in which a mechanical weak part serving as a curvature starting point when a rivet is press-fitted into a friction stirred part 4 is formed in the rivet itself. FIGS. 18(A) and 18(B) are perspective views of a cylindrical rivet 5D and a pin member 11B, respectively, which are used in a joining method according to the seventh embodiment. FIG. 18(C) is a cross-sectional view illustrating a preparation status of the joining method according to the seventh embodiment.

The cylindrical rivet 5D (fastener) is a rivet in a cylindrical shape having a constant inner diameter as with the cylindrical rivet 5C of the sixth embodiment, but is different from the cylindrical rivet 5C of the sixth embodiment in that the cylindrical rivet 5D includes an annular thin wall part serving as the mechanical weak part. The cylindrical rivet 5D includes a fitting part 5D1 (second part) and a press-fitting part 5D2 (first part) formed of a cylindrical body having a predetermined first wall thickness, and a ring groove 5D3 (annular thin wall part) provided between the fitting part 5D1 and the press-fitting part 5D2 and having a second wall thickness thinner than the first wall thickness.

The pin member 11B used in the seventh embodiment includes a main body 111, a leading end part 112, and a step part 113. The main body 111 is a columnar body having an outer diameter slightly smaller than an inner diameter of a shoulder member 12. The leading end part 112 is a columnar body connected to a lower end of the main body 111 and having a smaller diameter than the main body 111. The leading end part 112 has an outer diameter slightly smaller than the inner diameter of the cylindrical rivet 5D. The step part 113 is formed of a tapered slope provided at a boundary between the main body 111 and the leading end part 112.

As illustrated in FIG. 18(C), the fitting part 5D1 of the cylindrical rivet 5D is externally fitted onto the leading end part 112 of the pin member 11B. Then, the press-fitting part 5D2 is not held by the leading end part 112 and is press-fitted into the friction stirred part 4 of an overlapping part 30. The ring groove 5D3 is located at a height substantially equal to a lower end part 11T of the pin member 11B in a state where the fitting part 5D1 is externally fitted onto the leading end part 112. The present embodiment exemplifies a groove having a longitudinal section in a V-shape as the ring groove 5D3. A specific aspect of the ring groove 5D3 is not limited as long as the ring groove 5D3 is a thin wall part capable of reducing mechanical strength as compared with other parts of the cylindrical rivet 5D. During a preparation stage of joining, the pin member 11B is raised to allow the cylindrical rivet 5D to be accommodated in a hollow part of the shoulder member 12, and the fitting part 5D1 is externally fitted onto the leading end part 112.

Figure 19:
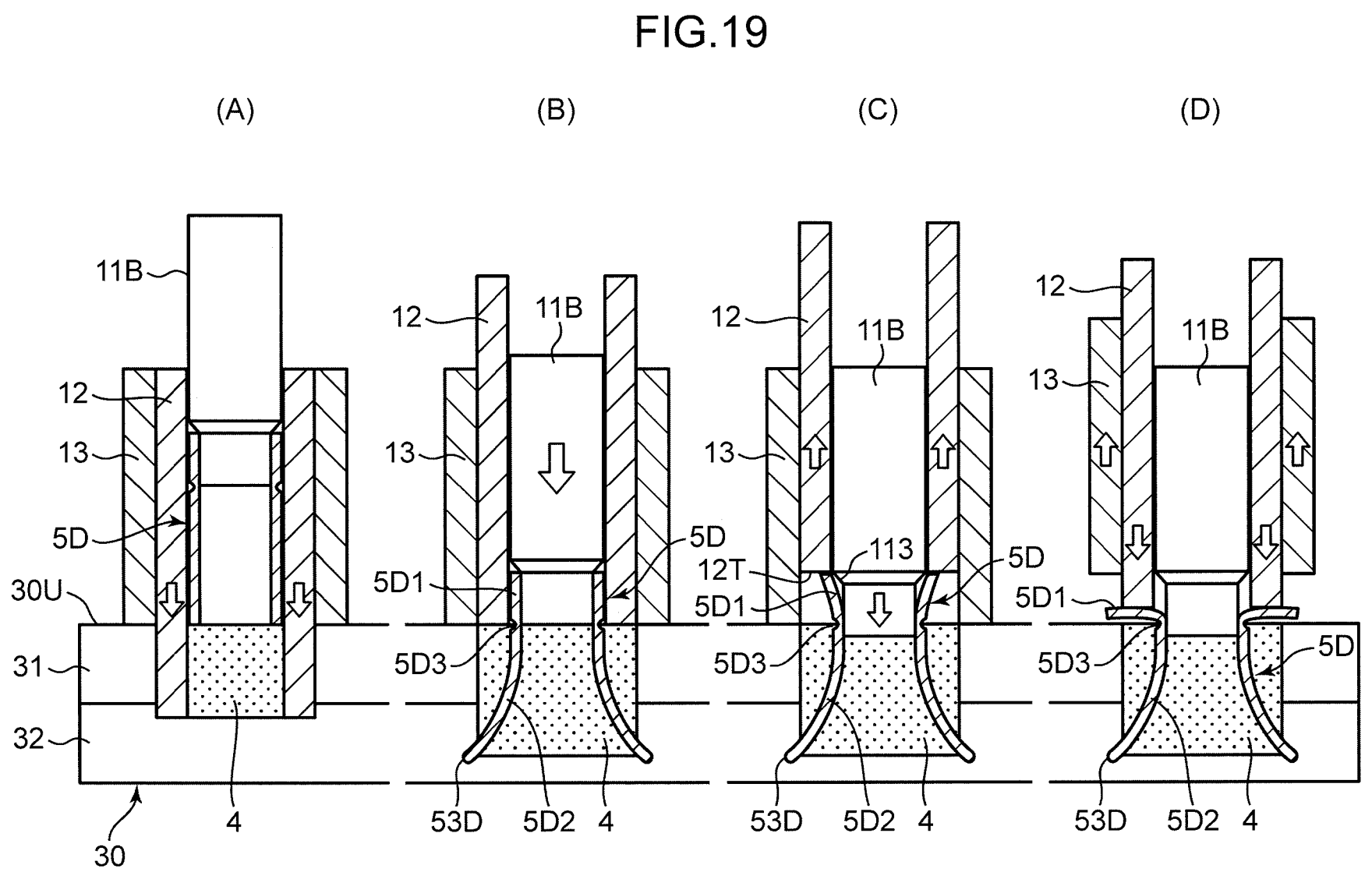

FIG. 19 illustrates a cross-sectional view of an implementation status of each of processes (A) to (D) of the joining method according to the seventh embodiment. Process (A) of FIG. 19 shows a state where friction stirring is performed on the overlapping part 30. The shoulder member 12 is press-fitted into the overlapping part 30 and rotated around an axis of the shoulder member 12 to form the friction stirred part 4. Process (B) of FIG. 19 shows a pushing process of the cylindrical rivet 5D. After the shoulder member 12 is raised to backfill a friction stirred material, the pin member 11B is lowered. This operation causes the press-fitting part 5D2 of the cylindrical rivet 5D to be press-fitted into the friction stirred part 4. The press-fitting part 5D2 expands and deforms from the ring groove 5D3 as a curvature starting point. The press-fitting part 5D2 includes a lower end part that penetrates into the second member 32 around the friction stirred part 4 to form an interlock part 53D.

Processes (C) and (D) of FIG. 19 show an expansion process of the fitting part 5D1. From the state of process (B), only the shoulder member 12 is raised to a position higher than an upper end of the fitting part 5D1. As a result, support for an outer peripheral surface of the fitting part 5D1 is removed. Thereafter, when the pin member 11B is slightly lowered, the step part 113 presses the upper end of the fitting part 5D1. This operation applies a tendency to be curved to the fitting part 5D1 to cause the fitting part 5D1 to start expanding and deforming from the ring groove 5D3 serving as the curvature starting point as shown in process (C). The tendency to be curved causes an upper end edge of the fitting part 5D1 to face a lower end part 12T of the shoulder member 12.

Subsequently, a clamp member 13 is raised while the shoulder member 12 is lowered as shown in process (D) of FIG. 19. This operation causes the fitting part 5D1 to greatly expand and deform without being obstructed by the clamp member 13. When the shoulder member 12 is further lowered, the outer peripheral surface of the fitting part 5D1 comes into contact with an upper surface 30U of the overlapping part 30. As a result, the fitting part 5D1 forms a flange part having a diameter larger than the friction stirred part 4. Thus, a joined body 3 including the friction stirred part 4 sandwiched between the interlock part 53D and the fitting part 5D1 can be formed.

The seventh embodiment uses the rivet 5D in a cylindrical shape, so that cost for forming the friction stir welded part can be reduced. The seventh embodiment also enables the press-fitting part 5D2 and the fitting part 5D1 to start expanding and deforming from the ring groove 5D3 serving as the curvature starting point, so that the curvature starting point can be stabilized, and damage such as cracking can be less likely to occur in the rivet 5D. The seventh embodiment may have a modification of using a rivet in a simple cylindrical shape without including the ring groove 5D3.

Joining Method According to Eighth Embodiment

Figure 20A:
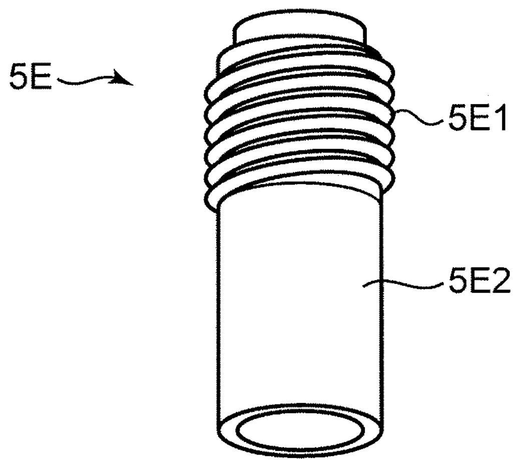
FIG. 20A is a perspective view of a threaded rivet used in a joining method according to an eighth embodiment.
Figure 20B:
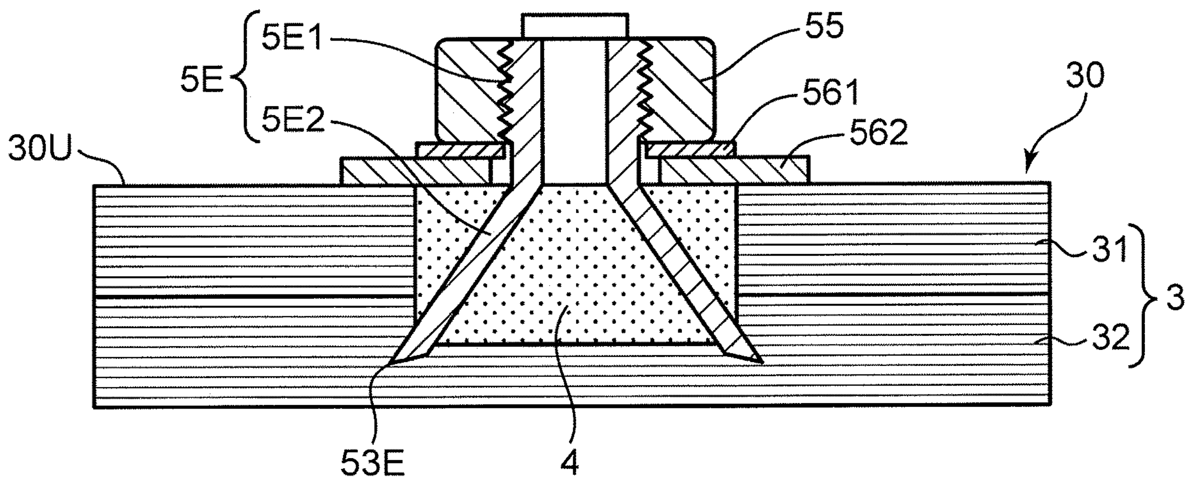
FIG. 20B is a cross-sectional view illustrating an implementation status of the joining method according to the eighth embodiment.

An eighth embodiment shows an example in which a rivet is used like a stud bolt. FIG. 20A is a perspective view of a threaded rivet 5E (fastener) used in a joining method according to the eighth embodiment, and FIG. 20B is a cross-sectional view illustrating an implementation status of the joining method according to the eighth embodiment.

The threaded rivet 5E is formed of a cylindrical body, and includes a threaded part 5E1 having a threaded groove, and a press-fitting part 5E2 to be press-fitted into an overlapping part 30. The threaded part 5E1 is disposed on one end side of the threaded rivet 5E and protrudes from the overlapping part 30. A nut 55 capable of being screwed onto the threaded groove of the threaded part 5E1 is preliminarily prepared as a fixing member.

The threaded rivet 5E is configured such that the press-fitting part 5E2 is press-fitted into the overlapping part 30 using a tool 1 for friction stir spot welding as in the embodiments above, for example. This press-fitting causes the press-fitting part 5E2 to expand and deform, thereby forming an interlock part 53E. Thereafter, the nut 55 is screwed onto the threaded part 5E1 protruding from an upper surface 30U of the overlapping part 30 with a spring washer 561 and a flat washer 562 that are interposed between the nut 55 and the threaded part 5E1.

The flat washer 562 is selected to have a larger outer diameter than a friction stirred part 4, and an inner diameter allowing the threaded part 5E1 to be loosely fitted. When the nut 55 is fastened, the flat washer 562 is pressed against the upper surface 30U of the overlapping part 30 with the spring washer 561 interposed between the flat washer 562 and the upper surface 30U. Thus, a joined body 3 including the friction stirred part 4 sandwiched between the interlock part 53E and the flat washer 562 can be formed. Alternatively, the spring washer 561 and the flat washer 562 may not be used. This case desires to use a nut having a larger diameter than the friction stirred part 4 as the nut 55.

The eighth embodiment causes the threaded rivet 5E to be press-fitted into the friction stirred part 4 with the threaded part 5E1 protruding from the overlapping part 30, and the nut 55 to be fastened to the threaded part 5E1. Thus, a locking effect due to the fastening of the nut 55 is added to a locking effect of the interlock part 53E, so that the overlapping part 30 can be more firmly joined.

Other Modifications

Although the embodiments of the present disclosure are described above, the present disclosure is not limited to the above embodiments. For example, modifications of the embodiments as described below can be adopted.

Figure 15:
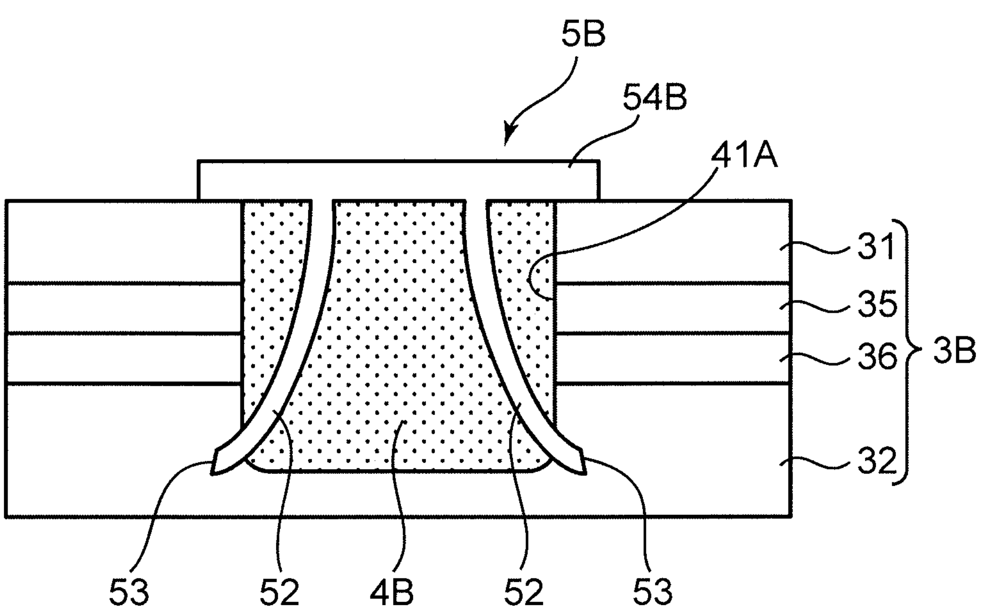
FIG. 15 is a cross-sectional view illustrating a joined body according to another modification.

(1) The above embodiments each show an example in which the overlapping part 30 is formed of two layers including the first member 31 and the second member 32. The overlapping part 30 may be formed of a multilayer of three or more layers. FIG. 15 is a cross-sectional view of a joined body 3B according to a modification. The joined body 3B is formed of a laminate of four layers including a first member 31 and a second member 32 with a third member 35 and a fourth member 36 interposed therebetween.

The first member 31 is disposed on an uppermost layer on a side on which a tool 1 is first press-fitted in friction stirring, and the second member 32 is disposed on a lowermost layer on a side on which the tool 1 is finally press-fitted. A friction stirred part 4B is formed passing through the first member 31, the third member 35, and the fourth member 36 and reaching a depth of about half of the second member 32. A rivet 5B includes a shaft part 52 with a part near its lower end, the part serving as an interlock part 53, and the interlock part 53 penetrates into a base material part of the second member 32. Then, a flange part 54B is engaged with an upper surface of the first member 31.

Figure 21:
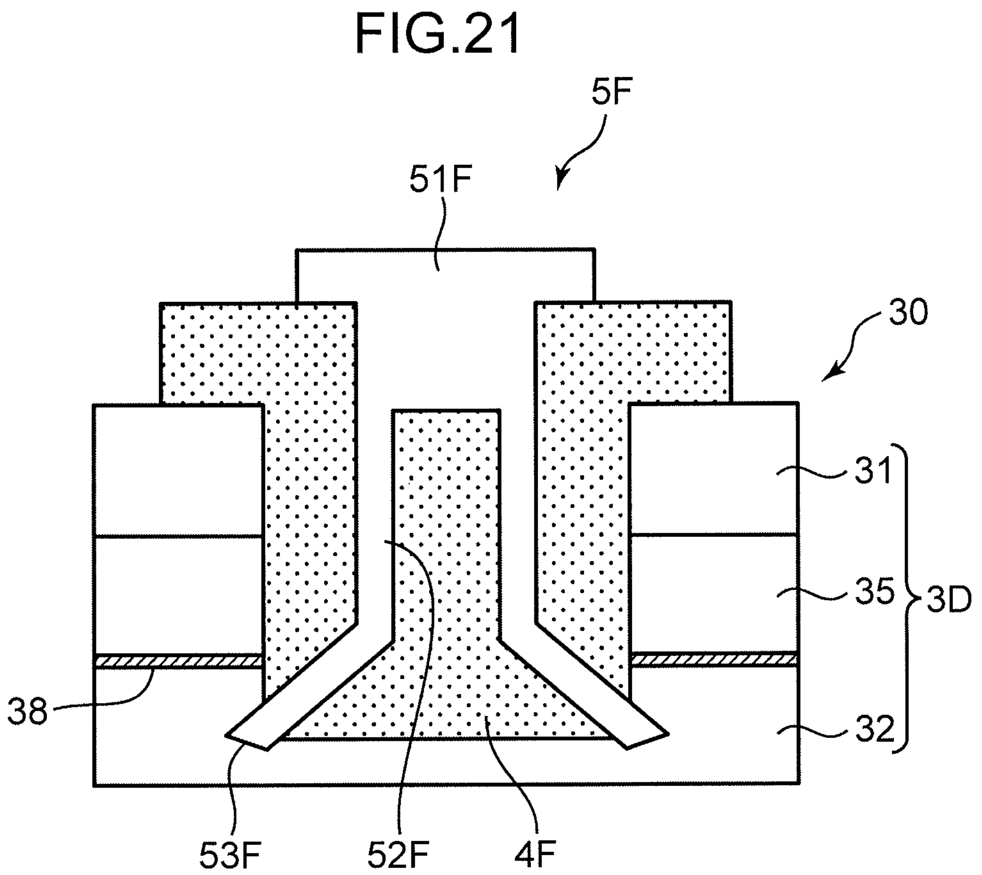
FIG. 21 is a cross-sectional view illustrating a joined body according to still another modification.

(2) To increase bending rigidity and peel strength of a joined body to be subjected to friction stir welding, interlayers of respective members constituting the overlapping part 30 may be preliminarily bonded by a fixing means such as fusion or adhesion before friction stirring. When the overlapping part 30 is formed of a multilayer of three or more layers, at least one interlayer is preliminarily bonded between the corresponding layers. FIG. 21 is a cross-sectional view illustrating an example of a joined body 3D in which one interlayer between corresponding layers of the overlapping part 30 is preliminarily fixed before friction stirring. The joined body 3D is formed of a laminate of three layers including a first member 31 and a second member 32 with a third member 35 interposed therebetween. Between the third member 35 and the second member 32, a bonding part 38 is provided to preliminarily integrate these members. A friction stirred part 4F passes through the first member 31 and the third member 35 and reaches a depth of about half of the second member 32. A rivet 5F includes a shaft part 52F with a part near its lower end, the part serving as an interlock part 53F, and the interlock part 53F penetrates into a base material part of the second member 32. A head part 51F is exposed on an upper surface of the friction stirred part 4F.

When the overlapping part 30 for the joined body 3D is formed, the bonding part 38 is provided between an upper surface of the second member 32 and a lower surface of the third member 35 to bond the surfaces to each other. The bonding part 38 can be formed by various fusion bonding methods such as ultrasonic fusion bonding and thermal fusion bonding, or an adhesion method using an adhesive or the like, for example. The bonding part 38 may be provided on the entire surface of a mating surface between the second member 32 and the third member 35, or may be provided in a dotted shape or a stripe shape. Friction stirring and driving of the rivet 5F after the overlapping part 30 is formed can be performed by a method similar to those of the above embodiments.

The bonding part 38 may be provided on a mating surface between the first member 31 and the third member 35, or may be provided on both the mating surface between the first member 31 and the third member 35, and the mating surface between the second member 32 and the third member 35. When the members are preliminarily integrated by forming the bonding part 38, the joined body 3D after being completed can be increased in bending rigidity and peel strength. The same applies to an overlapping part 30 formed of four or more layers. The overlapping part 30 formed of four or more layers has three or more mating surfaces formed between corresponding members. The mating surfaces include at least one mating surface that is preliminarily bonded. In particular, the members are preferably bonded while being aggregated into two sets (groups) of members including an uppermost layer member and of members including a lowermost layer member. When the overlapping part 30 is formed of two layers of the first member 31 and the second member 32, the bonding part 38 can be provided between the layers. In this case, the peel strength between the first member 31 and the second member 32 is increased.

(3) The above embodiments each show an example in which the double-acting friction stir spot welding tool 1 is used as a tool for forming the friction stirred part 4. Alternatively, available examples of the tool include a tool for linear welding of friction stirring, a tool being single acting for friction stir spot welding, and another tool for friction stir welding.

(4) The above embodiments each show an example in which the interlock part 53 formed by the shaft part 52 of the rivet 5 has a larger diameter than the friction stirred part 4 (e.g., FIGS. 8A to 8C). That is, the example is shown in which the lower end part 522 of the shaft part 52 is expanded radially outward from the side peripheral surface 41 of the friction stirred part 4. The interlock part 53 only needs to exert an anchor effect on the base material part of the second member 32, and thus is not limited to the aspects of the above embodiments.

Figure 16:
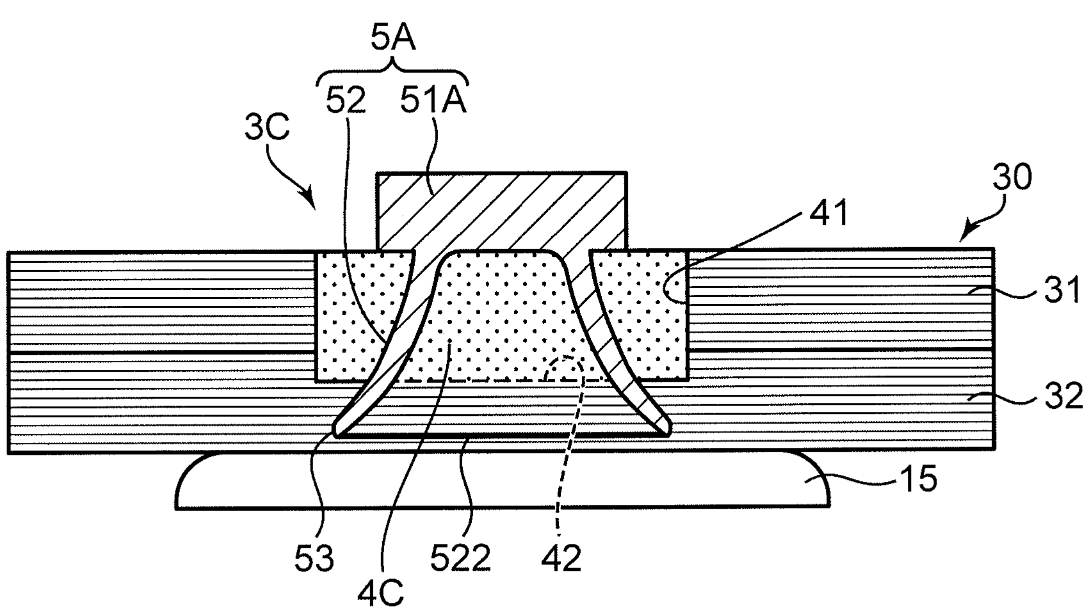
FIG. 16 is a cross-sectional view illustrating a joined body according to still another modification.

FIG. 16 is a cross-sectional view illustrating a joined body 3C according to another modification. A rivet 5A is press-fitted into a friction stirred part 4C formed in an overlapping part 30. The rivet 5A includes a shaft part 52 that entirely penetrates below the friction stirred part 4C. The shaft part 52 is deformed into a bell shape to form an interlock part 53 in which a lower end part 522 of the shaft part 52 is press-fitted into a base material part of the second member 32. Then, the interlock part 53 exists still in a region radially inside a side peripheral surface 41 of the friction stirred part 4C. Even the interlock part 53 configured as described above can exert a sufficient anchor effect.

Aspects of Invention Included in Above Embodiments

A joining method according to an aspect of the present disclosure uses a tool for friction stir welding and a fastener to join an overlapping part formed including a first member on a tool side and a second member disposed below the first member, the joining method including: press-fitting the tool into the overlapping part to perform friction stirring, and forming a friction stirred part in the overlapping part; and press-fitting the fastener into the friction stirred part from a first member side.

In the above joining method, an interlock part is preferably formed by causing a part of the fastener to penetrate into the second member after the fastener is press-fitted. This joining method enables obtaining a joined body in which the first member and the second member are firmly engaged due to an anchor effect exerted by the interlock part.

In the above joining method, the interlock part is preferably formed by deforming the fastener after the press-fitting is started and allowing a part of the fastener to penetrate into the second member existing around the friction stirred part. The friction stirred part has an alleviated inhibiting factor of deformation of the fastener, so that the fastener is likely to be deformed as intended. The above joining method enables the interlock part to be reliably formed by deformation of the fastener.

In the above joining method, the friction stirred part is preferably formed passing through the first member and reaching a part of the second member. This aspect enables the interlock part to be more reliably formed in the second member.

In the above joining method, the fastener is preferably press-fitted into the friction stirred part using the tool. This joining method enables performing the joining method without separately preparing a tool for driving a fastener.

In the above joining method, the tool is preferably a double-acting friction stir spot welding tool, the tool including a pin member in a columnar shape that rotates around an axis of the pin member and is movable forward and backward in a direction of the axis, and a shoulder member in a cylindrical shape that is located covering an outer periphery of the pin member and that rotates around an axis identical to the pin member while being movable forward and backward in the direction of the axis, and the fastener is press-fitted into the friction stirred part by lowering the pin member or the shoulder member.

This joining method performs friction stirring and press-fitting of the fastener using the pin member or the shoulder member of the tool. Thus, operation of friction stirring and operation of press-fitting the fastener can be increased in degree of freedom.

The above joining method preferably includes: raising the pin member to create an accommodation space in the shoulder member, and preliminarily loading the fastener in the accommodation space; press-fitting the shoulder member into the overlapping part to perform the friction stirring; and lowering the pin member to press-fit the fastener.

This joining method allows the shoulder member to perform friction stirring with the fastener preliminarily loaded in the tool, and the pin member to subsequently press-fit the fastener. Thus, the press-fitting of the fastener from the friction stirring can be smoothly performed in a flow process.

The above joining method may include: press-fitting the pin member or the shoulder member into the overlapping part to perform the friction stirring; disposing the fastener at a position between the friction stirred part and a lower part of the pin member or lower parts of the pin member and the shoulder member; and lowering the pin member or the shoulder member to press-fit the fastener. This joining method enables operation of friction stirring and operation of press-fitting the fastener to be increased in degree of freedom.

In the above joining method, the fastener preferably includes a head part to which a press-fitting force is applied, and after the interlock part is formed, the head part of the fastener is preferably deformed to form a flange part that is engaged with an upper surface of the friction stirred part or an upper surface of the first member around a peripheral edge of the friction stirred part.

This joining method allows the friction stirred part to be sandwiched between the interlock part and the flange part. That is, a structure is fabricated in which the upper surface of the friction stirred part is engaged with the flange part with the interlock part as a holding base point, the interlock part exerting a strong anchor effect by being press-fitted into a base material part of the second member. This structure enables enhancing fixability of the friction stirred part to the overlapping part to obtain the joined body excellent in stability.

The above joining method may include preliminarily bonding at least one interlayer between corresponding layers of members constituting the overlapping part before friction stirring using the tool.

This joining method enables bending rigidity and peel strength of the joined body to be further increased because the interlayer of the members constituting the overlapping part is already bonded before friction stirring.

A joined body according to another aspect of the present disclosure is a joined body of an overlapping part formed including a first member and a second member, the joined body including: an overlapping part in which the first member is disposed on one end side in an overlapping direction overlapping the second member having a second thickness disposed on another end side in the overlapping direction; a friction stirred part provided in the overlapping part; and a fastener press-fitted into the friction stirred part.

In the above joined body, the fastener preferably includes an interlock part in which a part of the fastener penetrates into the second member. This joined body enables the first member and the second member to be firmly joined due to an anchor effect exerted by the interlock part.

In the above joined body, the friction stirred part is preferably formed passing through the first member and reaching a part of the second member. According to this aspect, in addition to a joining force of the interlock part, a joining force of the friction stirred part can also be applied to the overlapping part.

In the above joined body, the second member or each of the first member and the second member is preferably made of a fiber-reinforced thermoplastic resin. In particular, at least the second member is preferably formed of a molding in which continuous fibers are impregnated with a thermoplastic resin.

When members made of thermoplastic resin containing reinforcing fibers, particularly continuous fibers, are joined to each other by press-fitting a fastener, the fibers may inhibit deformation of the fastener, and thus the fastener may fail to exert an anchor effect on an overlapping part. In contrast, the above joined body allows the fastener to be driven into a friction stirred part in which the fibers are divided by friction stirring and the thermoplastic resin is softened. Thus, the fastener is likely to be deformed in the friction stirred part. As a result, an interlock part exerting an excellent anchor effect is formed.

In the above joined body, the fastener is preferably a self-piercing rivet including a head part and a shaft part that is connected to the head part and includes a hollow region therein, and the interlock part is preferably formed of a part of the shaft part, the part being deformed in a lower end region of the shaft part. This joined body can be constructed having excellent strength using a self-piercing rivet that is generally used for various overlapping parts.

In the above joined body, the fastener preferably includes a head part to which a press-fitting force is applied when the fastener is driven, and the head part preferably includes a flange part engaged with an upper surface of the friction stirred part or an upper surface of the first member around a peripheral edge of the friction stirred part.

This joined body forms a state in which the friction stirred part is sandwiched between the interlock part and the flange part. That is, a structure is fabricated in which the upper surface of the friction stirred part is engaged with the flange part with the interlock part as a holding base point, the interlock part exerting a strong anchor effect. This structure enables enhancing fixability of the friction stirred part to the overlapping part to obtain the joined body excellent in stability.

The above joined body may include the overlapping part formed by interposing one or more other members between the first member and the second member. This joined body enables applying high joint strength to a joined body formed of members stacked in three or more layers.

The invention claimed is:

1. A joining method using a tool for friction stir welding and a fastener to join an overlapping part formed including a first member on a tool side and a second member disposed below the first member, the joining method comprising:

press-fitting the tool into the overlapping part to perform friction stirring, and forming a friction stirred part in the overlapping part; and after forming the friction stirred part, press-fitting the fastener into the friction stirred part from a first member side.

2. The joining method according to claim 1, wherein an interlock part is formed by causing a part of the fastener to penetrate into the second member after the fastener is press-fitted, the interlock part is formed by deforming the fastener after the press-fitting is started and allowing a part of the fastener to penetrate into the second member existing around the friction stirred part, and the friction stirred part is formed passing through the first member and reaching a part of the second member.

3. The joining method according to claim 1, wherein the fastener is press-fitted into the friction stirred part using the tool.

4. The joining method according to claim 3, wherein the tool is a double-acting friction stir spot welding tool, the tool including:

a pin member in a columnar shape that rotates around an axis of the pin member and is movable forward and backward in a direction of the axis; and a shoulder member in a cylindrical shape that is located covering an outer periphery of the pin member and that rotates around an axis identical to the pin member while being movable forward and backward in the direction of the axis, and the fastener is press-fitted into the friction stirred part by lowering the pin member or the shoulder member.

5. The joining method according to claim 4, comprising:

raising the pin member to create an accommodation space in the shoulder member, and preliminarily loading the fastener in the accommodation space;

press-fitting the shoulder member into the overlapping part to perform the friction stirring; and lowering the pin member to press-fit the fastener.

6. The joining method according to claim 5, wherein the fastener is a cylindrical rivet, the pin member includes a lower end surface provided with an annular groove allowing a part of the cylindrical rivet to be accommodated, and the cylindrical rivet is press-fitted by lowering the pin member with an upper region of the cylindrical rivet fitted in the annular groove.

7. The joining method according to claim 5, wherein the fastener is a cylindrical rivet having a fitting part externally fitted onto the pin member and a press-fitting part press-fitted into the overlapping part, the pin member includes a leading end part allowing the fitting part to be externally fitted, and the pin member is lowered to press-fit the press-fitting part while the fitting part is externally fitted onto the leading end part, and then the shoulder member is lowered to expand and deform the fitting part.

8. The joining method according to claim 4, further comprising:

press-fitting the pin member or the shoulder member into the overlapping part to perform the friction stirring;

disposing the fastener at a position between the friction stirred part and a lower part of the pin member or lower parts of the pin member and the shoulder member; and lowering the pin member or the shoulder member to press-fit the fastener.

9. The joining method according to claim 2, wherein the fastener includes a head part to which a press-fitting force is applied, and after the interlock part is formed, the head part of the fastener is deformed to form a flange part that is engaged with an upper surface of the friction stirred part or an upper surface of the first member around a peripheral edge of the friction stirred part.

10. The joining method according to claim 1, wherein the fastener is a threaded rivet including a threaded part having a threaded groove, and a press-fitting part to be press-fitted into the overlapping part, and the press-fitting part is press-fitted into the friction stirred part, and then a fixing member capable of being screwed onto the threaded groove is attached to the threaded part.

11. The joining method according to claim 1, comprising:

preliminarily bonding at least one interlayer between corresponding layers of members constituting the overlapping part before friction stirring using the tool.

12. A joined body of an overlapping part formed including a first member and a second member, the joined body comprising:

an overlapping part in which the first member is disposed on one end side in an overlapping direction overlapping the second member disposed on another end side in the overlapping direction;

a friction stirred part provided in the overlapping part; and a fastener press-fitted into the friction stirred part from the first member side after forming the friction stirred part.

13. The joined body according to claim 12, wherein the fastener includes an interlock part in which a part of the fastener penetrates into the second member, the friction stirred part is formed passing through the first member and reaching a part of the second member, the second member or each of the first member and the second member is made of a fiber-reinforced thermoplastic resin, and at least the second member is formed of a molding in which continuous fibers are impregnated with a thermoplastic resin.

14. The joined body according to claim 13, wherein the fastener is a self-piercing rivet including a head part and a shaft part that is connected to the head part and includes a hollow region therein, and the interlock part is formed of a part of the shaft part, the part being deformed in a lower end region of the shaft part.

15. The joined body according to claim 12, wherein the fastener includes a head part to which a press-fitting force is applied when the fastener is driven, and the head part includes a flange part engaged with an upper surface of the friction stirred part or an upper surface of the first member around a peripheral edge of the friction stirred part.

16. The joined body according to claim 12, wherein the fastener is a cylindrical rivet in a shape having a constant inner diameter before being press-fitted into the friction stirred part.

17. The joined body according to claim 12, wherein the fastener is a cylindrical rivet including a first part press-fitted into the overlapping part, a second part expanded and deformed after the first part is press-fitted, and an annular thin wall part provided between the first part and the second part.

18. The joined body according to claim 12, wherein the overlapping part is formed by interposing one or more other members between the first member and the second member.

19. The joined body according to claim 12, wherein the fastener includes a threaded part having a threaded groove, and a press-fitting part to be press-fitted into the overlapping part, and a fixing member attached to the threaded part by being screwed onto the threaded groove.

* * * * *